(12) United States Patent
Hinatsu et al.

(10) Patent No.: US 8,057,646 B2
(45) Date of Patent: Nov. 15, 2011

(54) ELECTROLYSER AND COMPONENTS THEREFOR

(75) Inventors: James T. Hinatsu, Mississauga (CA); Michael C. Stemp, Toronto (CA)

(73) Assignee: Hydrogenics Corporation, Mississauga (CA)

( * ) Notice: Subject to any disclaimer, the term of this patent is extended or adjusted under 35 U.S.C. 154(b) by 988 days.

(21) Appl. No.: 11/721,098

(22) PCT Filed: Dec. 7, 2005

(86) PCT No.: PCT/CA2005/001861
§ 371 (c)(1), (2), (4) Date: Oct. 31, 2007

(87) PCT Pub. No.: WO2006/060912
PCT Pub. Date: Jun. 15, 2006

(65) Prior Publication Data
US 2009/0229990 A1    Sep. 17, 2009

Related U.S. Application Data

(60) Provisional application No. 60/633,448, filed on Dec. 7, 2004.

(51) Int. Cl.
*C25B 9/20* (2006.01)
*C25B 1/08* (2006.01)
(52) U.S. Cl. ......... 204/256; 204/258; 204/266; 205/628
(58) Field of Classification Search ........................ None
See application file for complete search history.

(56) References Cited

U.S. PATENT DOCUMENTS

| | | | |
|---|---|---|---|
| 2,075,688 | A | 3/1937 | Zdansky et al. |
| 4,031,001 | A | 6/1977 | Bosa |
| 4,051,009 | A | 9/1977 | Schweickart et al. |
| 4,274,939 | A | 6/1981 | Bjareklint |
| 4,505,789 | A | 3/1985 | Ford |
| 4,605,482 | A | 8/1986 | Shiragami et al. |
| 4,758,322 | A | 7/1988 | Sioli |
| 5,139,635 | A | 8/1992 | Signorini |
| 5,429,725 | A | 7/1995 | Thorpe et al. |
| 5,591,319 | A | 1/1997 | Miller et al. |
| 5,690,797 | A | 11/1997 | Harada et al. |
| 5,783,051 | A | 7/1998 | Hirai et al. |

(Continued)

FOREIGN PATENT DOCUMENTS
CA    1031292 A    5/1978

(Continued)

OTHER PUBLICATIONS

Written Opinion issued Jun. 13, 2007 in respect of PCT/CA2005/001861.

(Continued)

*Primary Examiner* — Harry D Wilkins, III
(74) *Attorney, Agent, or Firm* — Bereskin & Parr LLP/S.E.N.C.R.L., s.r.l.

(57) ABSTRACT

The present invention is directed to cell plates for an electrolyser module and to an electrolyser module incorporating the plates. The plates comprise an electrolysis chamber opening, at least one degassing chamber opening, and at least one gas-liquid conduit opening. The plates further comprise a channel connecting the electrolysis chamber opening and the gas-liquid conduit opening. The present invention is directed further to a process and apparatus for separating a gas-liquid mixture generated at an electrolysis cell.

44 Claims, 15 Drawing Sheets

U.S. PATENT DOCUMENTS

| | | | |
|---|---|---|---|
| 6,080,290 | A | 6/2000 | Stuart et al. |
| 6,146,518 | A | 11/2000 | Fairlie et al. |
| 6,149,810 | A * | 11/2000 | Gonzalez-Martin et al. ............ 210/321.84 |
| 6,187,155 | B1 | 2/2001 | Stuart et al. |
| 6,254,741 | B1 | 7/2001 | Stuart et al. |
| 6,338,786 | B1 | 1/2002 | Thorpe et al. |
| 6,365,032 | B1 | 4/2002 | Shiepe et al. |
| 6,395,154 | B1 | 5/2002 | Stuart et al. |
| 6,432,283 | B1 | 8/2002 | Fairlie et al. |
| 6,474,330 | B1 | 11/2002 | Fleming et al. |
| 6,554,978 | B1 * | 4/2003 | Vandenborre ............ 204/258 |
| 7,824,527 | B2 | 11/2010 | Vandenborre |
| 2002/0175072 | A1 | 11/2002 | Sioli |
| 2003/0141200 | A1 | 7/2003 | Harada |
| 2003/0171200 | A1 | 9/2003 | Nishijima et al. |
| 2007/0215492 | A1 * | 9/2007 | Vandenborre ............ 205/799 |

FOREIGN PATENT DOCUMENTS

| | | | |
|---|---|---|---|
| CA | 2051859 | A1 | 3/1992 |
| CA | 1317711 | C | 5/1993 |
| CA | 2271517 | A1 | 11/2000 |
| CA | 2370031 | A1 | 11/2000 |
| CA | 2379018 | A1 | 2/2001 |
| CA | 2300770 | A1 | 9/2001 |
| CA | 2520486 | A1 | 10/2004 |
| CH | 107000 | A | 10/1924 |
| EP | 0056759 | | 7/1984 |
| EP | 0137836 | B1 | 9/1989 |
| EP | 0427340 | A1 * | 5/1991 |
| EP | 0427340 | B1 | 7/1993 |
| EP | 0232923 | B2 | 5/1996 |
| EP | 0995818 | A1 | 4/2000 |
| EP | 1133586 | B1 | 7/2002 |
| EP | 1194716 | B1 | 1/2003 |
| EP | 1528126 | A1 | 5/2005 |
| GB | 1547581 | A | 6/1979 |
| JP | 08-085892 | | 4/1996 |
| JP | 08-260176 | | 10/1996 |
| JP | 09-078278 | | 3/1997 |
| JP | 2001-130901 | | 5/2001 |
| JP | 2003-342773 | | 3/2003 |
| JP | 2003-221690 | | 8/2003 |
| JP | 2003-277963 | | 10/2003 |
| WO | 84/03523 | A1 | 9/1984 |
| WO | 97/00979 | A1 | 1/1997 |
| WO | 98/32900 | A1 | 7/1998 |
| WO | 00/22191 | A1 | 4/2000 |
| WO | 00/70126 | A1 | 11/2000 |
| WO | 00/70262 | A1 | 11/2000 |
| WO | 03/064727 | A1 | 8/2003 |
| WO | 2004/087997 | A2 | 10/2004 |
| WO | 2005/049894 | A1 | 6/2005 |
| WO | WO 2005/049894 | A2 * | 6/2005 |
| WO | 2006/060912 | A1 | 6/2006 |

OTHER PUBLICATIONS

Written Opinion issued May 1, 2006 in respect of PCT/EP2004/012354.

Vandenborre et al., "Developments on IME-Alkaline Water Electrolysis", Int. J. Hydrogen Energy, 1983, 81-83, 8 (2).

Vandenborre et al., "A Survey of Five Year Intensive R&D Work in Belgium on Advanced Alkaline Water Electrolysis", Int. J. Hydrogen Energy, 1984, 277-284, 9(4).

Vandenborre et al., "Advanced Alkaline Water Electrolysis using Inorganic Membrane Electrolyte (I.M.E.) Technology", Int. J. Hydrogen Energy, 1985, 719-726, 10(11).

Janssen et al., "Safety-Related Studies on Hydrogen Production in High-Pressure Electrolysers", Int. J. Hydrogen Energy, 2004, 759-770, 29.

Janssen et al., "High-Pressure Electrolysis The Key Technology for Efficient H2 Production", Hypothesis IV Proceedings, 2001, 172-177, 1.

* cited by examiner

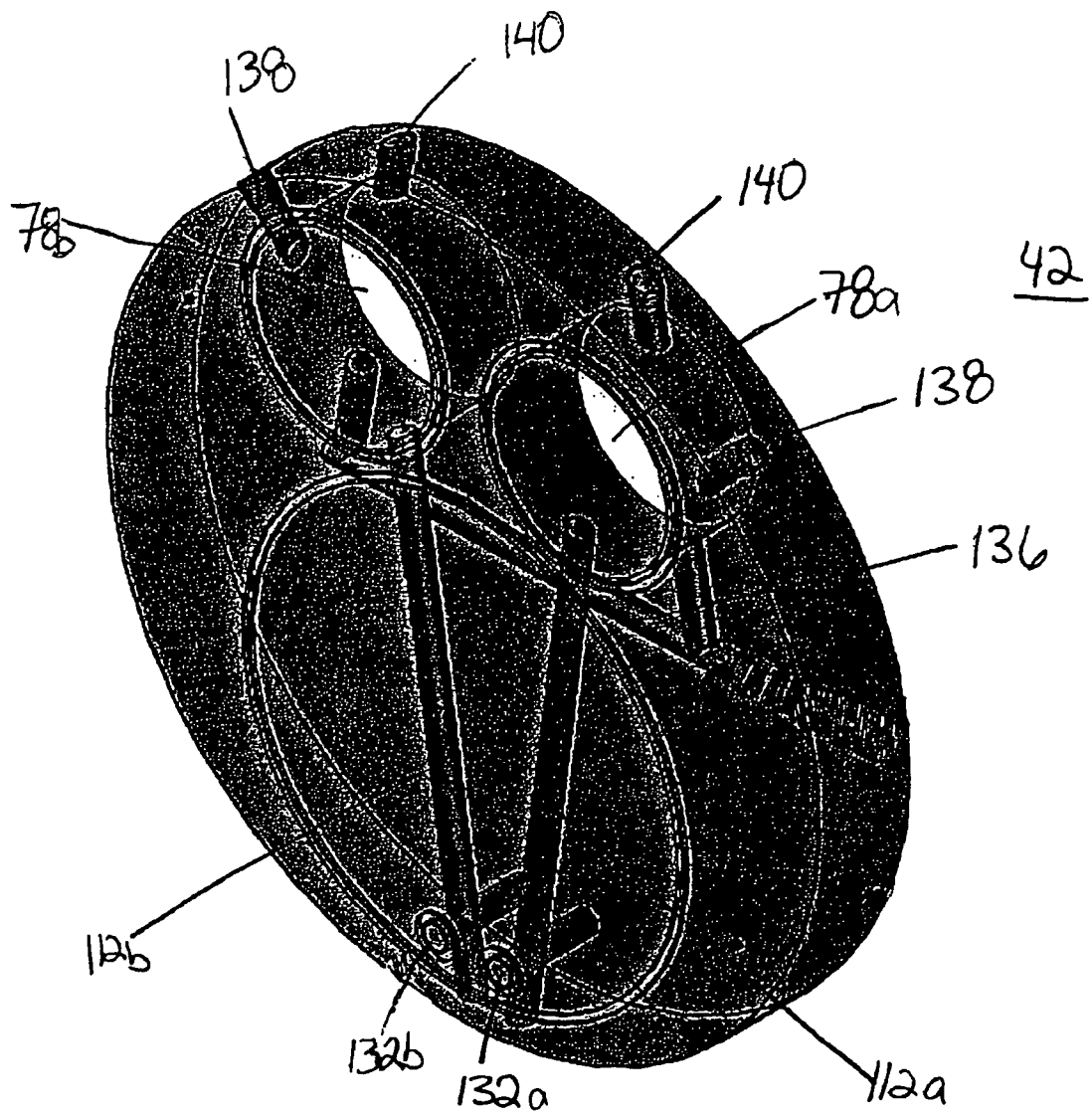

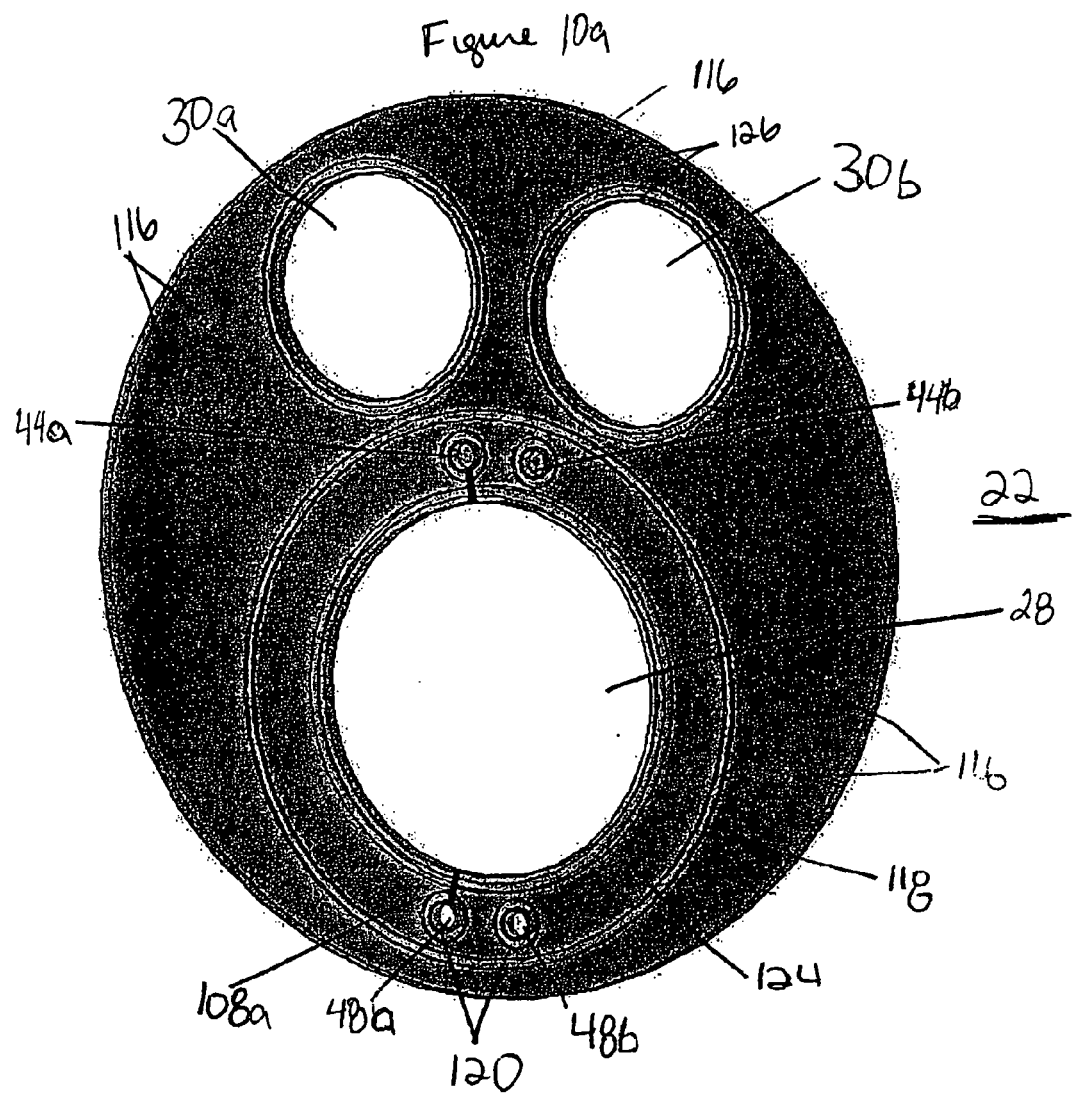

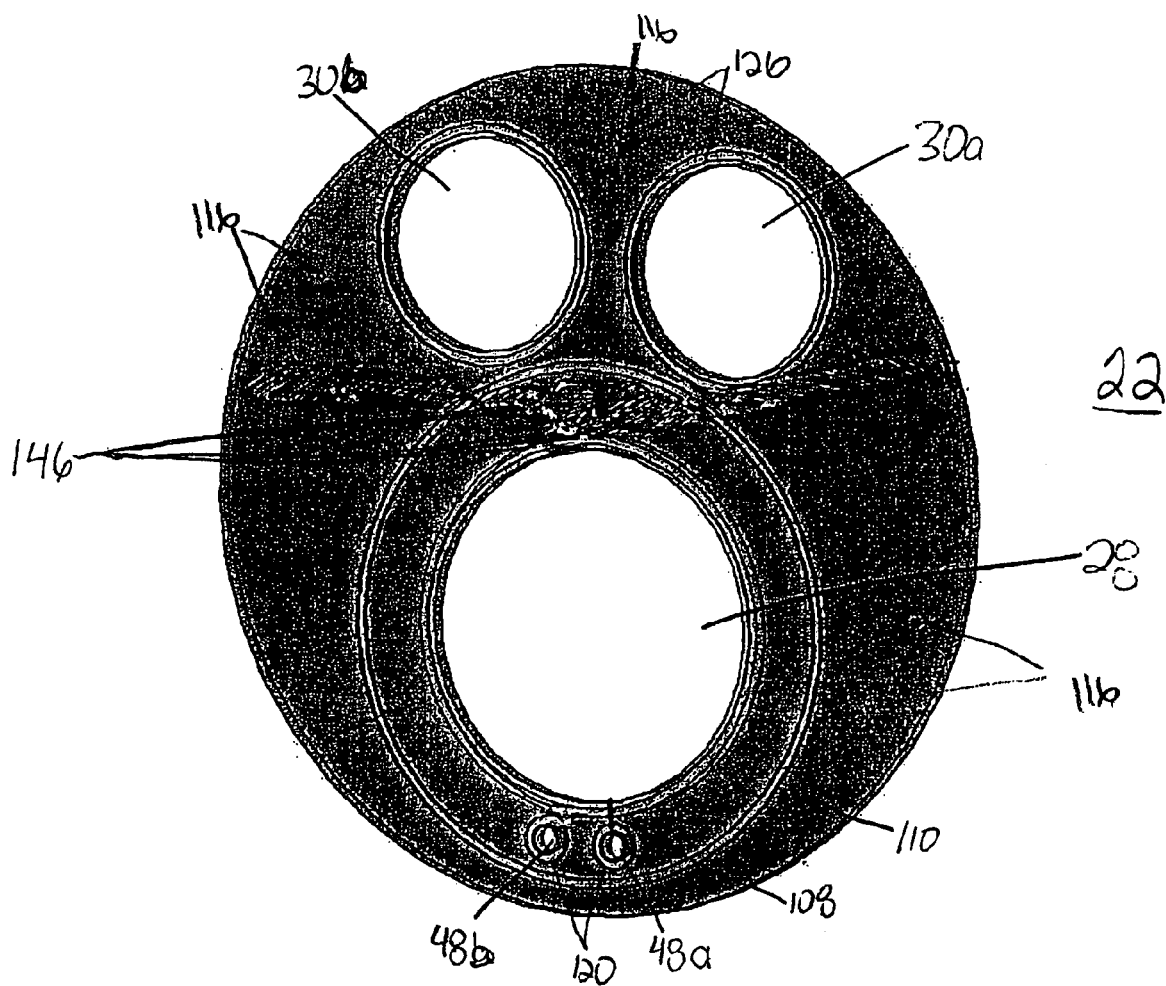

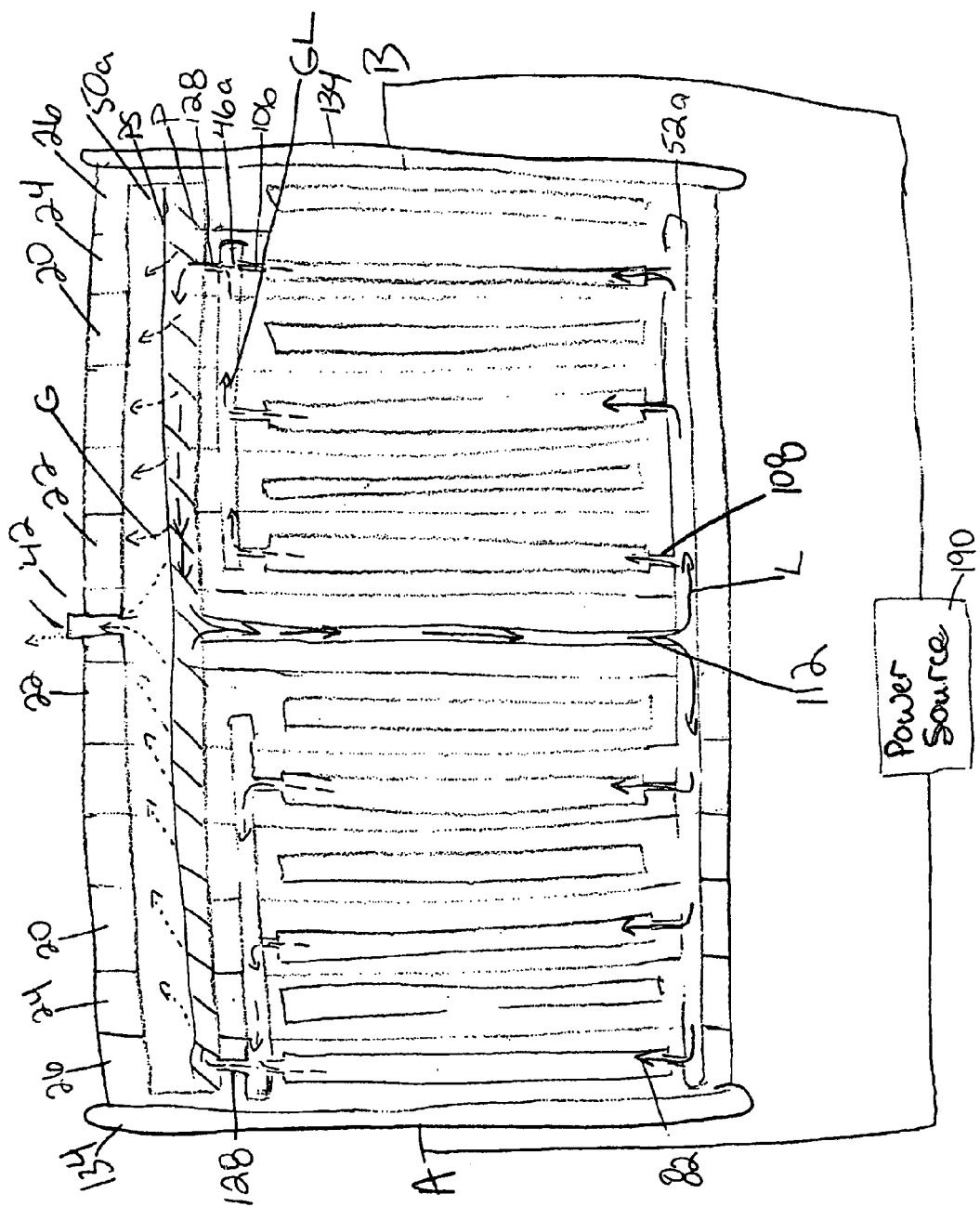

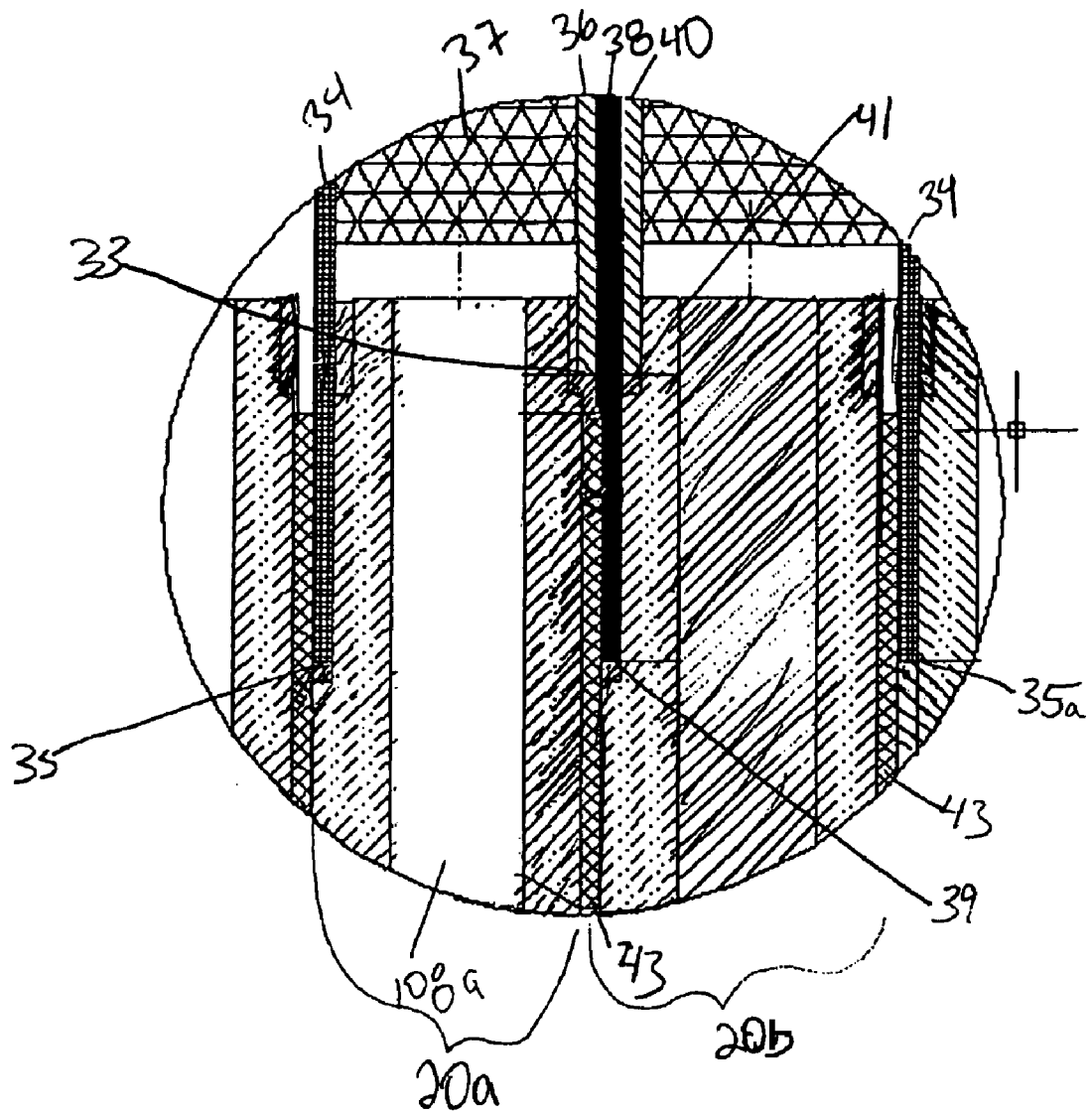

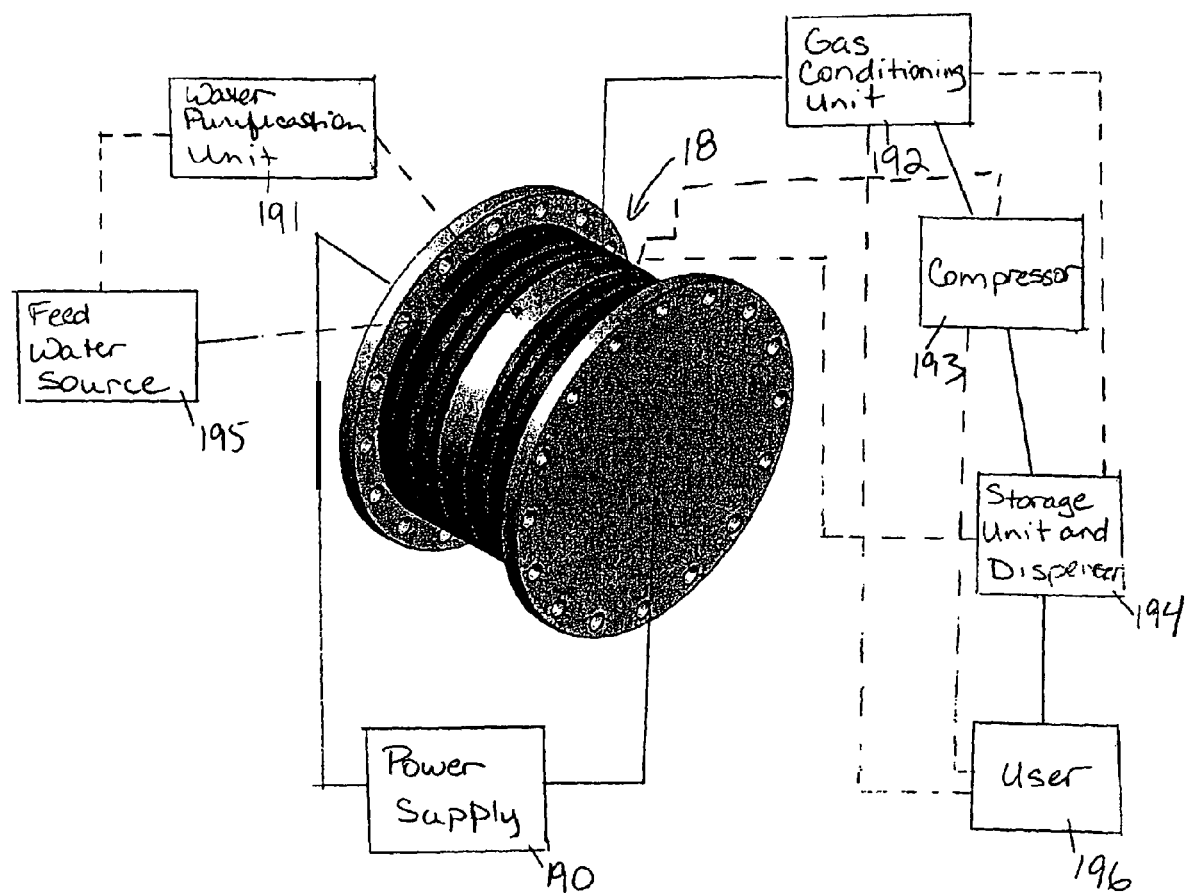

ELECTROLYSER AND COMPONENTS THEREFOR

FIELD OF THE INVENTION

The present invention relates to the design of electrochemical cells and electrochemical systems, and more particularly to an electrolyser and components therefor.

BACKGROUND OF THE INVENTION

Electrosynthesis is a method for production of chemical reaction(s) that is electrically driven by passage of an electric current, typically direct current (DC), through, for example, a liquid, such as an electrolyte, between an anodic electrode (anode) and a cathodic electrode (cathode). An electrochemical cell is used for electrochemical reactions and comprises an anode and cathode which are in intimate contact with the electrolyte. The current is generated from an external power source and is passed between the two electrodes. Each electrode typically comprises about half of the electrochemical cell. The rate of production is proportional to the current flow in the absence of parasitic reactions. For example, in a liquid alkaline water electrolysis cell, DC is passed between the two electrodes in an aqueous electrolyte to split water, the reactant, into the component product gases, hydrogen and oxygen, which evolve at the surfaces of the respective electrodes. Water electrolysers have typically relied on cell separator membranes or diaphragms combined with pressure control systems to control the pressure between the two halves of an electrolysis cell to ensure that the gases produced in the electrolytic reaction are kept separate and do not mix.

As used herein, the terms "cell", "electrolysis cell", "electrochemical cell" and equivalent variations thereof refer to a structure comprising an anodic electrolysis chamber and a cathodic electrolysis chamber. Selectively permeable membranes or diaphragms (both referred to herein after as "membranes") are disposed within the cell to prevent the gases produced at each electrode from intermixing within the electrolysis cell. An "electrolysis chamber" comprises one electrode and is separated from the other electrolysis chamber of the cell by the membrane. The electrolysis chamber is referred to as an anodic electrolysis chamber or a cathodic electrolysis chamber depending on whether the electrode is an anode or a cathode, respectively. In each electrolysis chamber, electrodes are typically mounted in close contact with the membrane. This can be accomplished, for example, by pressing the membrane between the electrodes. Membranes that are particularly suited to this purpose are described in EP-A-0 232 923 and U.S. Pat. No. 6,554,978, both of which are hereby incorporated by reference.

Multiple cells may be connected either in series or in parallel to form what are commonly called electrolyser cell "stacks". Theoretically, there is no limit to how many cells may be used to form a cell stack. The term "electrolyser" or "electrolyser module" refers to the combination of an electrolyser cell stack and such peripheral components as degassing chambers and the necessary piping to connect the operative parts. The term "electrolyser system" refers to an electrolyser module and any equipment used in combination therewith, such as power supply equipment, water purification and supply equipment, and may also include gas conditioning and compressing equipment, electricity regenerator equipment, and equipment for storage and subsequent dispensing of the gas.

In the operation of a cell stack during the electrolysis of aqueous electrolyte, the anode serves to generate oxygen gas whereas the cathode serves to generate hydrogen gas. The two gases are kept separate and distinct by the membrane. In some types of electrolyser modules currently used, the flow of gases and electrolytes within the stack may be conducted via circulation gasket assemblies which also act to seal the structure of one electrolysis chamber to another electrolysis chamber and to prevent leakage of electrolyte and gas from the structure.

In some electrolyser modules currently used, an end box is situated at both ends of the stack. The end boxes serve several functions including providing a return channel for electrolyte flowing out from the top of the cell. They may also provide a location for components used for controlling the electrolyte level, for example, liquid level sensors, and temperature regulators, for example, heaters, coolers or heat exchangers. In addition, with appropriate sensors in the end boxes, individual cell stack electrolyte and gas purity may be monitored. Also, while most of the electrolyte is recirculated through the electrolyser, an electrolyte stream may be taken from each end box to provide external level control, electrolyte density, temperature, cell pressure and gas purity control and monitoring. This stream would be returned to either the same end box or mixed with other similar streams and returned to the end boxes. Alternatively, probes may be inserted into the end boxes to control these parameters.

As a gas is produced in the anodic electrolysis chamber or cathodic electrolysis chamber of the cell, it is mixed with the liquid of the cell to form a gas-liquid mixture. The gas will rise to the top of the cell but it requires time and space to become effectively separated from the liquid (through, for example, natural phase separation) and subsequently released. The end box as described above is sometimes used as an area to allow gas-liquid separation. Another typically used mechanism to allow the gas-liquid separation to occur is to utilize degassing chambers which are located externally to the cell stack. Each gas generated in the cells may enter a degassing chamber through a series of pipes or other connections attached to the cells. The degassing chambers may be located above the cells and benefit from the lower density of the gas and the gas-liquid mixture (relative to the liquid alone) which causes them to rise up to the degassing chambers. This location of the degassing chambers relative to the cells allows the degassed liquid to flow back down to the cells with the aid of gravity. Alternatively, pumps are used to pump the gas-liquid mixtures to the appropriate degassing chambers. The extra equipment required in these scenarios has the drawback that it is costly and it increases the space requirement for the electrolyser module. In addition, the extra pieces required to connect the degassing chambers to the cells provide opportunities for leakage, resulting in costly and time-consuming maintenance of the electrolyser module.

In an attempt to solve the problems associated with such degassing chambers, some electrolyser modules have been designed so that the degassing chambers are integrated with the cells. In some such designs, each electrolysis chamber of a cell stack is in direct communication with a degassing chamber through a first channel through which gas-liquid mixture enters the degassing chamber. Gas evolves from the gas-liquid mixture and the degassed liquid exits the degassing chambers through a second channel which is in direct communication with the appropriate electrolysis chamber and is situated below the first channel. For example, European patent application no. 1194716 (which is incorporated herein by reference) describes cell plates (referred to as holding frames) which define openings for an electrolysis chamber and openings for one or more degassing chambers where each cell plate is in direct communication with an associated degassing chamber. It has now been determined that integrated electrolyser modules of this design do not provide optimal conditions for removal of entrained gas from the liquid. In addition, such designs do not provide optimal conditions for increasing overall current efficiency of the electrolysis reactions and do not allow for effective differential pressure control between the anodic and cathodic electrolysis chambers. There is, therefore, a need for an electrolyser module which improves upon problems with the prior designs as described above.

SUMMARY OF THE INVENTION

In one aspect, the invention provides an electrolyser module comprising a plurality of cell plates arranged together to define at least one electrolysis cell, at least one degassing chamber, at least one gas-liquid conduit, and at least one gas-liquid channel connecting the at least one electrolysis cell to the at least one gas-liquid conduit; at least one transfer channel for connecting the gas-liquid conduit to the at least one degassing chamber; and at least one gas outlet conduit for connecting the at least one degassing chamber to a desired location for receiving gas and at least one degassed liquid conduit for connecting the at least one degassing chamber to a desired location for receiving degassed liquid. At least one transfer channel may be connected proximate to an end of the at least one gas-liquid conduit and/or at least one transfer channel is connected proximate to an end of the at least one degassing chamber. The invention also provides an electrolyser module wherein the at least one transfer channel has one end that is connected proximate to an end of the at least one gas-liquid conduit and another end that is connected proximate to an end of the at least one degassing chamber. The electrolyser module may also comprise at least one gasket disposed between the cell plates. Each of the cell plates may also define nesting surfaces for nesting with adjacent the cell plates and may comprise a pressure equalization conduit.

In another aspect, the invention provides an electrolyser system comprising an electrolyser module in combination with any of a power supply system, a water purification system, a gas compression system, a gas storage system, a gas dispensing system connected to the gas storage system, an electricity regeneration system, and a gas conditioning system.

In another aspect, the invention provides cell plate for an electrolyser module, the cell plate comprising a body; at least one electrolysis chamber opening defined in the body; at least one degassing chamber opening defined in the body; at least one gas-liquid conduit opening defined in the body; and a channel defined in the body which connects the at least one electrolysis chamber opening to the at least one gas-liquid conduit opening. The cell plate may further define at least one degassed liquid conduit opening, may have a non-rectilinear peripheral shape, and may be comprised substantially of a thermoplastic material.

In another aspect, the invention provides a transfer plate for an electrolyser module, the transfer plate comprising a body; at least one electrolysis chamber opening defined in the body; at least one degassing chamber opening defined in the body; at least one gas-liquid conduit opening defined in the body; and a channel which connects the at least one gas-liquid conduit opening to the at least one degassing chamber opening. The transfer plate may have a non-rectilinear peripheral shape and may be comprised substantially of a thermoplastic material.

In another aspect, the invention provides a return plate for an electrolyser module, the return plate comprising a body; at least one degassing chamber opening defined in the body; at least one degassed liquid conduit opening defined in the body; a channel which connects the at least one degassing chamber opening to the at least one degassed liquid conduit opening. The return plate may be comprised substantially of a thermoplastic material and at least a portion of it may be comprised of a conductive material. The return plate may comprise any of a bipolar plate, at least one gas outlet opening, liquid feed inlet openings, openings for a mechanical circulation pump, liquid cooling lines, openings for detection or regulation equipment. The return plate may be substantially hollow.

In another aspect, the invention provides a process for separating a gas-liquid mixture generated within at least one electrolysis chamber, the process comprising the steps of:

(a) generating a gas-liquid mixture within at least one electrolysis chamber;

(b) transferring the gas-liquid mixture from the at least one electrolysis chamber to a first location of a degassing chamber and allowing gas to separate within the degassing chamber from the gas-liquid mixture to form a degassed liquid and a gas (c) transferring the gas from a second location of the degassing chamber to a desired location;

(d) transferring the degassed liquid from the second location of the degassing chamber to a desired location;

wherein the second location is sufficiently distant from the first location to allow optimal separation of gas and liquid from the gas-liquid mixture. The first location may be proximate to a first end of the degassing chamber and the second location may be proximate to a second end of the degassing chamber.

In another aspect, the invention provides an apparatus for separating a gas-liquid mixture generated within at least one electrolysis chamber, the apparatus comprising:

(a) means for generating a gas-liquid mixture within at least one electrolysis chamber;

(b) means for transferring the gas-liquid mixture from the at least one electrolysis chamber to a first location of a degassing chamber, (c) means for allowing gas to separate within the degassing chamber from the gas-liquid mixture to form a degassed liquid and a gas;

(d) means for transferring the gas from an opening at a second location of the degassing chamber to a desired location;

(e) means for transferring the degassed liquid from the second location of the degassing chamber to a desired location;

wherein the second location is sufficiently distant from the first location to allow optimal separation of gas and liquid from the gas-liquid mixture. The first location may be proximate to a first end of the degassing chamber and the second location may be proximate to a second end of the degassing chamber.

In another aspect, the invention provides an electrolyser module comprising at least one electrolysis chamber; at least one degassing chamber; at least one gas-liquid conduit in direct communication with the at least one electrolysis chamber; a gas-liquid channel connecting the at least one gas-liquid conduit to the at least one degassing chamber; at least one degassed liquid conduit in direct communication with the at least one electrolysis chamber; and a degassed liquid channel connecting the at least one degassing chamber to the at least one degassed liquid conduit.

In another aspect, the invention provides an electrolyser module having first and second ends, the electrolyser module comprising at least one electrolysis chamber; at least one degassing chamber defined within the electrolyser module which substantially extends from the first end to the second end; at least one gas-liquid conduit defined within the electrolyser module which substantially extends from the first end to the second end, the at least one gas-liquid conduit being in direct communication with at least one electrolysis chamber; at least one degassed liquid conduit defined within the electrolyser module which substantially extends from the first end to the second end, the at least one degassed liquid conduit being in direct communication with at least one electrolysis chamber; a gas-liquid channel defined at the first end of the electrolyser module which connects the at least one gas-liquid conduit to the at least one degassing chamber; and a degassed liquid channel defined at the second end of the electrolyser module which connects the at least one degassing chamber to the at least one degassed liquid conduit.

BRIEF DESCRIPTION OF FIGURES AND TABLE

FIG. 9 shows a perspective view of a return plate for the electrolyser module shown in FIG. 1.

FIG. 10a shows a perspective view of a first side of an end plate for the electrolyser module shown in FIG. 1.

FIG. 10b shows a perspective view of a second side of an end plate or the electrolyser module shown in FIG. 1.

FIG. 11 shows a schematic vertical sectional view of an electrolyser module in accordance with the present invention showing the flow paths of gas, liquid, and gas-liquid mixture.

FIG. 13 shows a schematic view of an alternative embodiment of a sealing system for the electrolyser module shown in FIG. 1.

FIG. 14 shows a schematic diagram of an electrolyser system in accordance with the present invention.

Table 1 shows some specifications of the chambers, conduits, and channels of the preferred embodiment based on the current test model.

The following is a detailed description of the drawings and the table and is meant to illustrate the invention and not to limit it thereto.

DETAILED DESCRIPTION OF THE INVENTION

Figure 1:
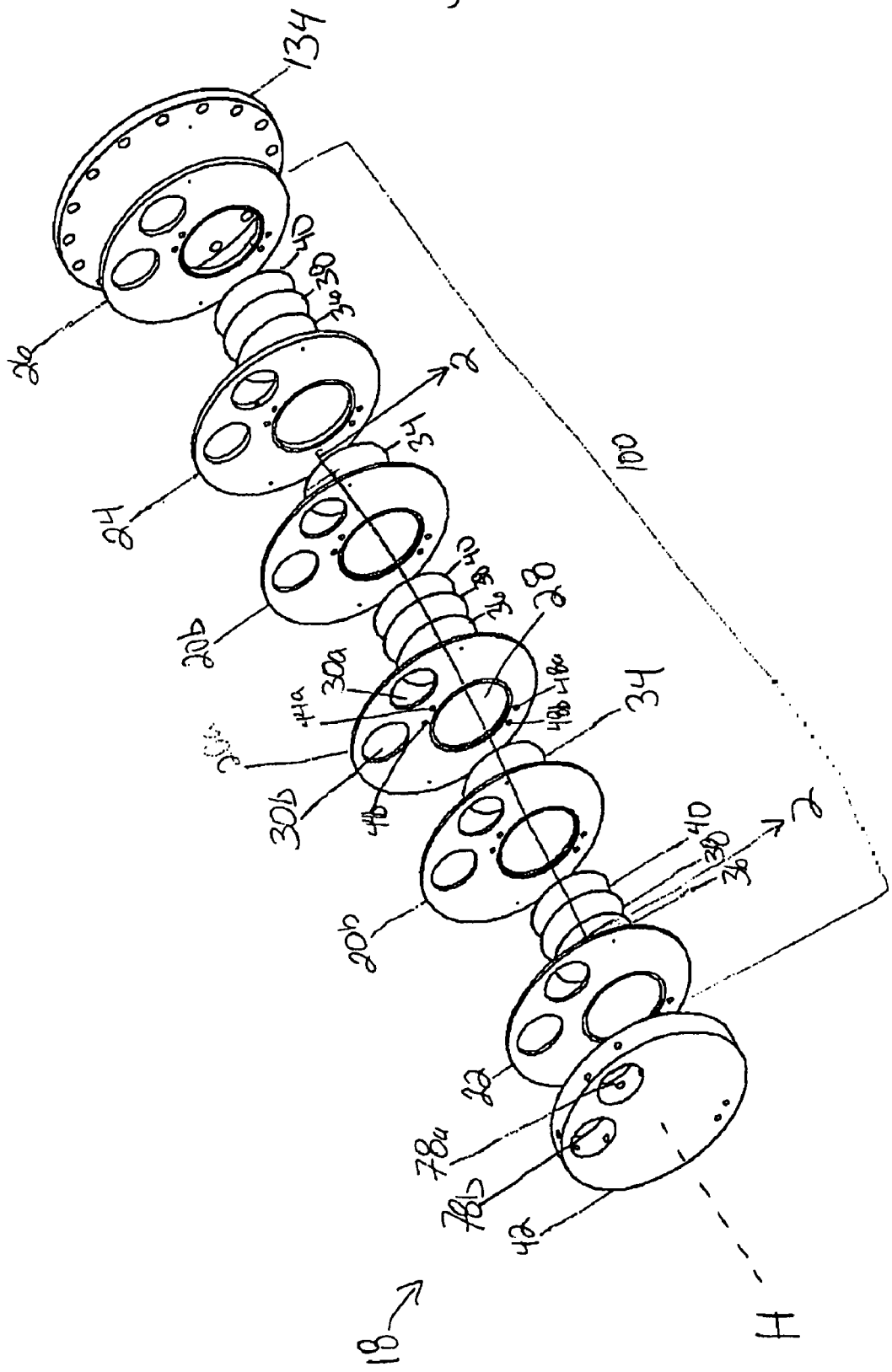
FIG. 1 shows an exploded perspective view of a portion of an electrolyser module in accordance with the present invention.

An electrolyser module in accordance with an aspect of the present invention is shown generally at 18 in FIGS. 1-11 (for ease of reference, FIG. 1 shows a portion of an electrolyser module; FIG. 11 shows a schematic sectional view of the entire electrolyser module). Electrolyser module 18 includes cell plates 20, end plate 22, transfer plates 24 and 26, and return plate 42. Electrolyser module 18 further includes bipolar plates 34, anode plates 36, cathode plates 40, and gas impermeable membranes 38 all as described below. Electrolyser module 18 thus comprises a plurality of electrolysis cells 83 having anodic and cathodic electrolysis chambers 82a and 82b arranged together. Each cell plate 20 defines one or more electrolysis chamber openings 28 and one or more degassing chamber openings 30 as described further below. Electrolysis chamber opening 28a functions as an anode electrolysis chamber 82a when associated with an anode when the electrolyser module is assembled. Cell plate 20 which defines electrolysis chamber opening 28a is referred to as anodic cell plate 20a. Conversely, electrolysis chamber opening 28b functions as a cathodic electrolysis chamber 82b when associated with a cathode. Cell plate 20 which defines electrolysis chamber opening 28b is referred to as cathodic cell plate 20b.

As used herein, the term "cell plate" refers to a body which defines at least one electrolysis chamber opening and at least one degassing chamber opening. A plurality of cell plates can be arranged together so that at least one electrolysis chamber and at least one degassing chamber is defined. The body is preferably integrally formed as one unitary body but may alternatively be formed by combining two or more body portions. A cell plate defining an anodic electrolysis chamber may be referred to as an anodic cell plate, and a cell plate defining a cathodic electrolysis chamber may be referred to as a cathodic cell plate. The term "transfer plate" or "return plate" as used herein refers to any plate or structure that is used to transfer a gas, a liquid, or a gas-liquid mixture to or from the degassing chamber to a desired location. A transfer plate and return plate may also have other functions as described below.

The cell plates of the present invention may have various shapes, but preferably have generally planar surfaces with a non-rectilinear peripheral shape and most preferably a round peripheral shape.

As shown in FIG. 1, electrolyser module 18 includes bipolar plate 34 which is electrically connected to anode plate 36 disposed on one side of bipolar plate 34 and to cathode plate 40 disposed on the other side of bipolar plate 34. Bipolar plate 34 is a solid plate made of a conductive material and provides electronic connection between neighbouring cells 83. Electric contact between bipolar plate 34, anode plate 36, and cathode plate 40 may be accomplished with suitable electrically conducting connectors 37 (shown in FIG. 2), such as woven metal placed between bipolar plate 34 and each of anode plate 36 and cathode plate 40. Alternatively, other methods of providing electrical contact between bipolar plate 34 and each of anode plate 36 and cathode plate 40 may be employed. A gas impermeable membrane 38 is disposed between and in close proximity to anode plate 36 and cathode plate 40 in order to prevent the gas produced at the cathode and the gas produced at the anode from intermixing. Membrane 38 is essentially in the middle of cell 83 and separates anodic electrolysis chamber 82a and cathodic electrolysis chamber 82b. The membrane may be a microporous diaphragm which has a high bubble point when wetted, or an ion exchange membrane such as a proton exchange membrane (PEM). The membrane may alternatively be made of materials disclosed in European patent application no. 0 232 923 and U.S. Pat. No. 6,554,978 (already incorporated herein by reference) or other suitable materials known in the art. During operation of electrolyser module 18, gas is evolved from the "backsides" of anode plate 36 and cathode plate 40. The backside of each electrode is the side which is opposed to the side of the electrode which is in close proximity to membrane 38.

Electrolyser module 18 is shown as being held together between head flange 134 at one end and another head flange 134 at the opposite end. A power supply 190 is electrically connected to each head flange by a conductive material, such as a metal wire, to form a cathodic (−) end B and an anodic (+) end A of the electrolyser module.

When a plurality of cell plates are arranged together, the degassing chamber openings 30 align to define continuous degassing chambers 50 that are preferably arranged along a horizontal axis H as described further below. The degassing chamber openings 30 include an opening 30a to form anodic degassing chamber 50a and an opening 30b to form cathodic degassing chamber 50b. Anodic degassing chamber 50a is used for separation of the gas-liquid mixture from anodic electrolysis chamber 82a (for example, an oxygen-liquid mixture), and cathodic degassing chamber 50b is used for separation of the gas-liquid mixture from cathodic electrolysis chamber 82b (for example, a hydrogen-liquid mixture).

Figure 2:
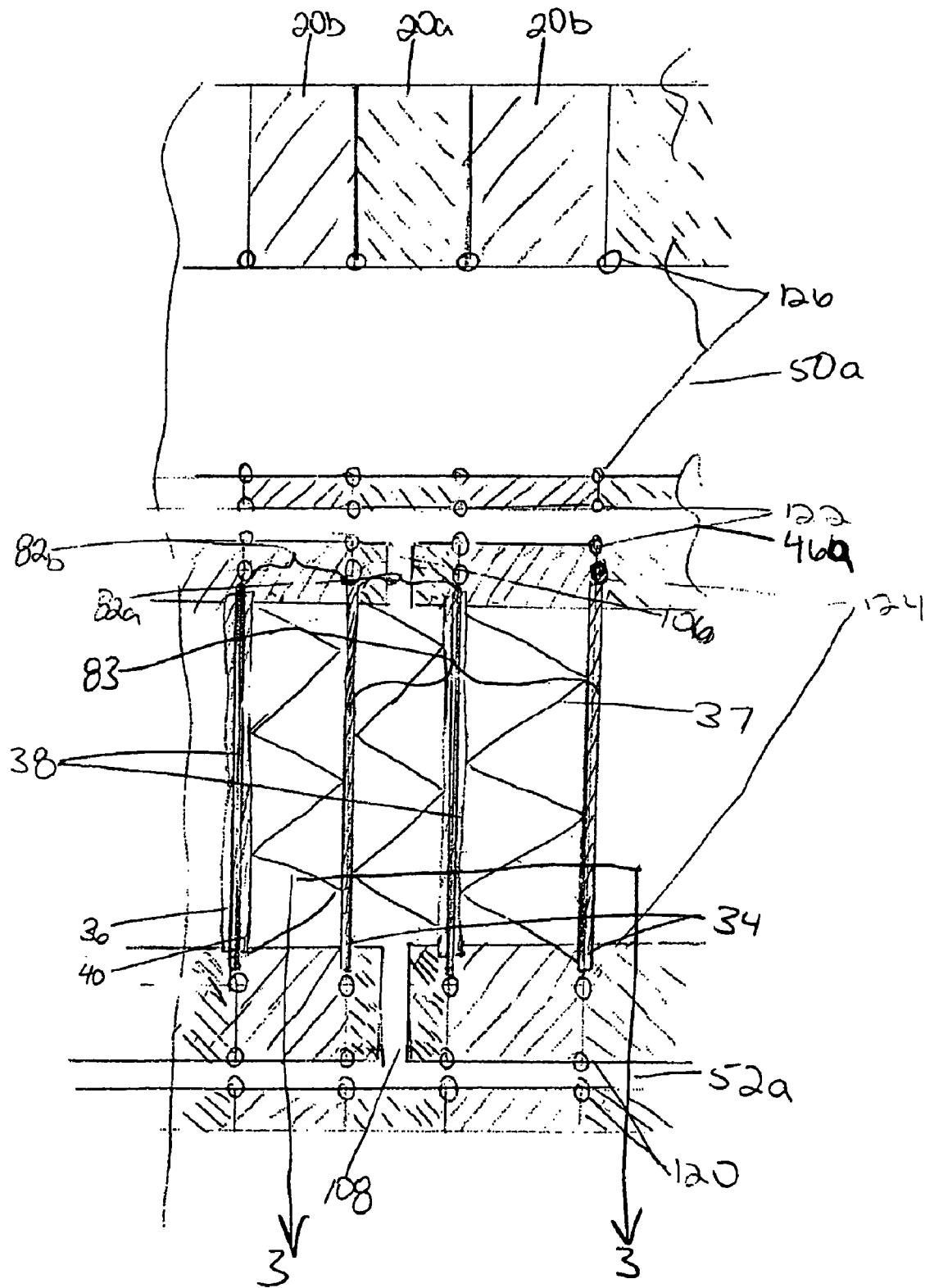
FIG. 2 shows a sectional view of the anodic and cathodic electrolysis chambers for the electrolyser module as viewed along lines 2-2 of FIG. 1 when assembled.

FIG. 2 shows a partial cross-section of the portion 2-2 of the electrolyser module shown in FIG. 1. Three cell plates 20 are arranged together as 20b-20a-20b (that is, cathodic cell plate-anodic cell plate-cathodic cell plate) and corresponding anodic electrolysis chamber 82a and cathodic electrolysis chamber 82b are shown in arrangement 82b-82a-82b. Electrolysis cell 83 comprises anodic and cathodic electrolysis chambers 82a and 82b. The boundaries of each electrolysis chamber 82 are defined by membrane 38 and bipolar plate 34. Anode plate 36 and cathode plate 40 are preferably pressed against opposite sides of membrane 38. The arrangement further comprises a woven metal sheet 37 which acts as a suitable electric conductor to electronically connect bipolar plate 34 to anode plate 36 on one side and cathode plate 40 on the other side.

Figure 3:
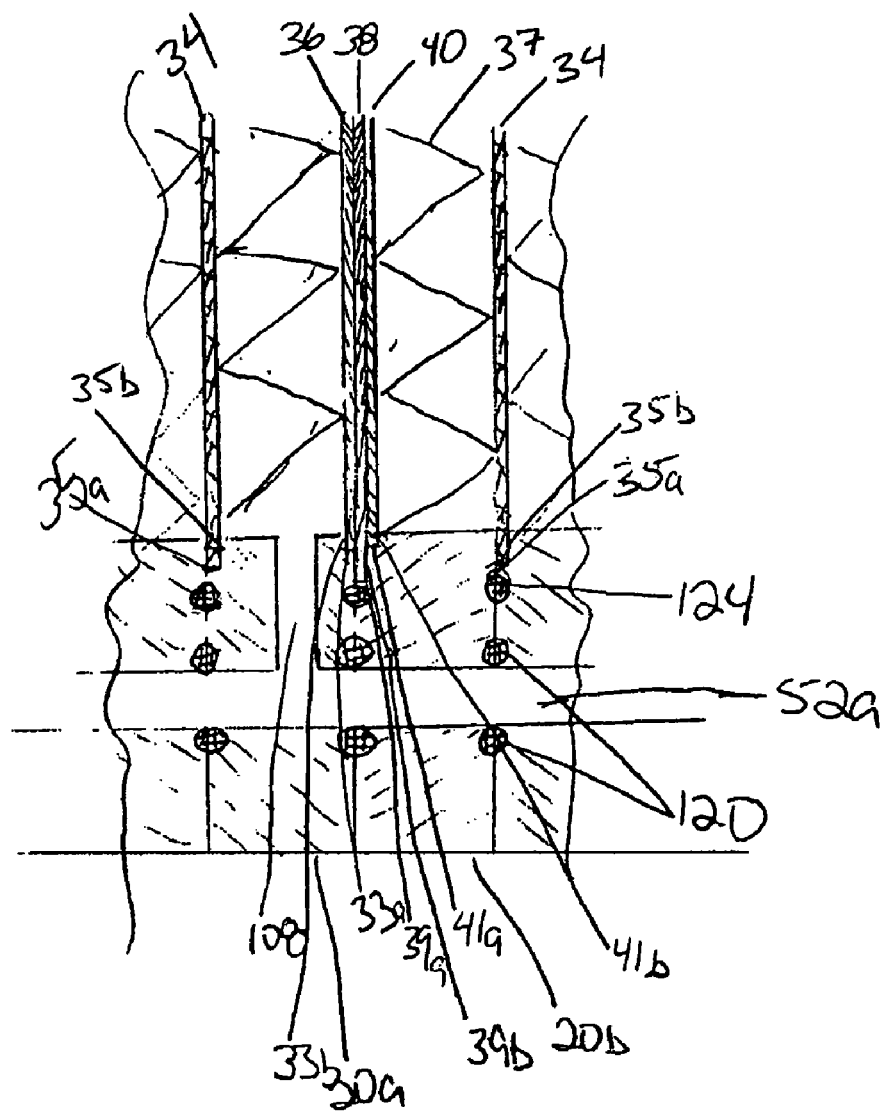
FIG. 3 shows an enlarged sectional view of an arrangement of components of the anodic and cathodic electrolysis chambers for the electrolyser module as viewed along lines 3-3 of FIG. 2.

Cell plates 20 have first and second opposing, generally planar, surfaces that define notches (described further below) which surround electrolysis chamber opening 28, as shown in FIG. 3. Each notch comprises a seat (a) and a wall (b) which are essentially orthogonal to each other. The first surface of anodic cell plate 20a defines bipolar plate notch 35. Bipolar plate notch 35 comprises bipolar plate notch seat 35a and bipolar plate notch wall 35b. Bipolar plate notch 35 surrounds anodic electrolysis chamber opening 28a and supports bipolar plate 34 by abutting the edge of bipolar plate 34 against bipolar plate notch seat 35a. In addition, the surface of bipolar plate 34 abuts against bipolar plate notch wall 35b when the cell plates 20 are arranged together. The second surface of cell plate 20a defines anode plate notch 33 which is comprised of anode plate notch seat 33a and anode plate notch wall 33b. In a similar manner to how bipolar plate notch 35 supports bipolar plate 34, anode plate notch 33 supports anode plate 36. Cathodic cell plate 20b defines on its first surface membrane notch 39 which comprises membrane notch seat 39a and membrane notch wall 39b and similarly supports membrane 38 when the cell plates are arranged together. Cathodic cell plate 20b also defines cathode plate notch 41 which comprises cathode plate notch seat 41a and cathode plate notch wall 41b. Cathode plate notch 41 similarly supports cathode plate 40 when the cell plates are arranged together. Membrane notch 39 and cathode plate notch 41 are concentric and surround cathodic electrolysis chamber opening 28b. Membrane notch 39 has a larger diameter than cathode plate notch 41 and is not recessed as deeply into cathodic cell plate 20b as is cathode plate notch 41. In this embodiment, there are no notches defined in the second surface of cathodic cell plate 20b. When cell plates 20 are arranged together to form an electrolyser module, the second surface of anodic cell plate 20a is arranged in sealing engagement with the first surface of cathodic cell plate 20b with anode plate 36, membrane 38, and cathode plate 40 disposed therebetween supported by their respective notches. The first surface of anodic cell plate 20a is similarly arranged in sealing engagement with the second surface of cathodic cell plate 20b with bipolar plate 34 disposed therebetween supported by bipolar plate notch 35. The seat of each notch is preferably of a depth that allows it to fully engage the edge of the respective electrodes, bipolar plate, or membrane. The seat of the notches which support the electrodes and bipolar plate are preferably of a depth which is sufficient to allow one planar surface of the electrode or bipolar plate to be generally in the same plane as a surface of the cell plate in which it is supported.

Figure 4:
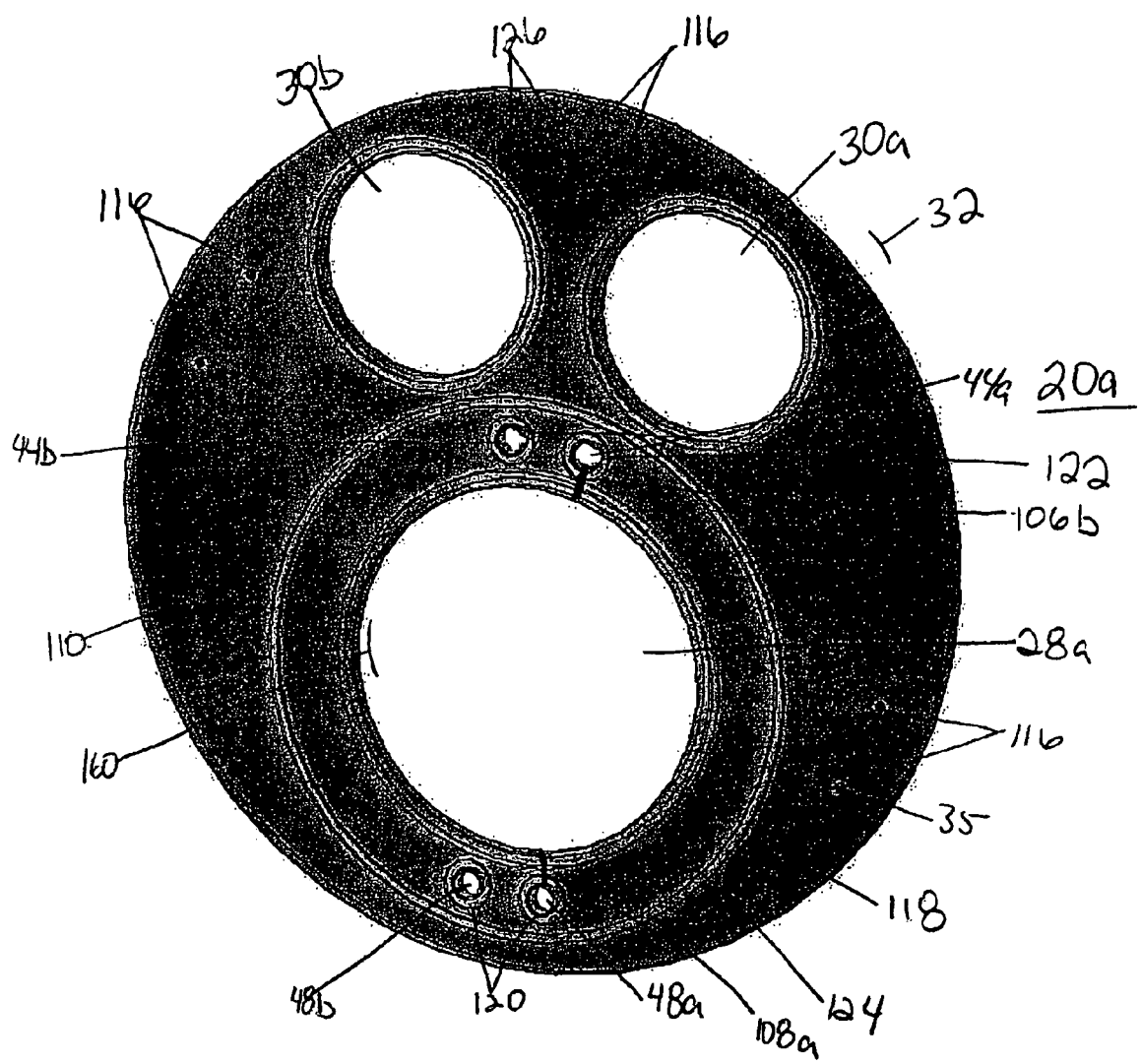
FIG. 4 shows a perspective view of an anodic cell plate for the electrolyser module shown in FIG. 1.
Figure 5:
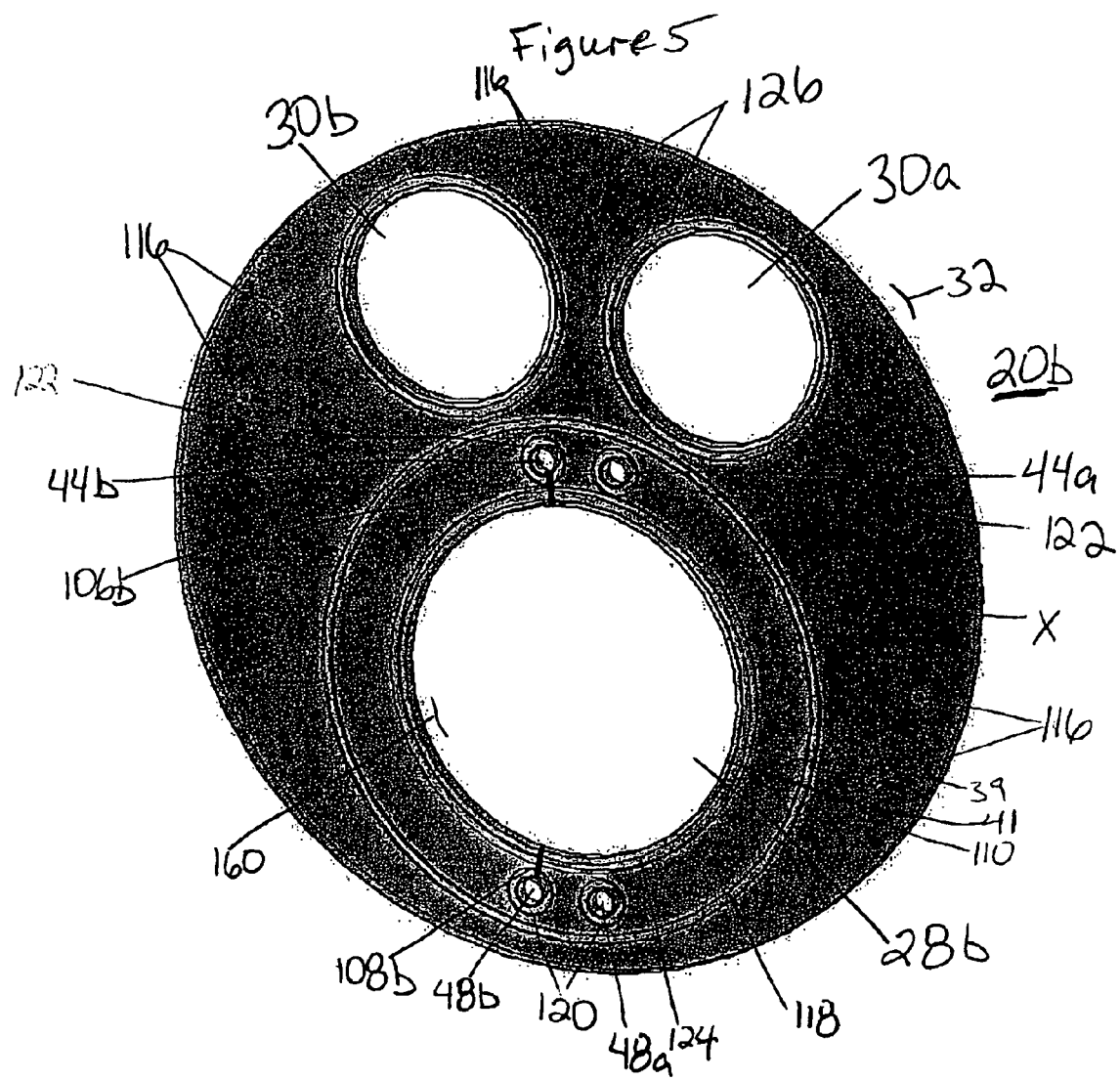
FIG. 5 shows a perspective view of a cathodic cell plate for the electrolyser module shown in FIG. 1.

FIGS. 4 and 5 show front perspective views of the first surfaces of anodic cell plate 20a and cathodic cell plate 20b. In addition to defining electrolysis chamber opening 28, cell plate 20 further defines anodic and cathodic degassing chamber openings 30a and 30b, anodic and cathodic gas-liquid conduit openings 44a and 44b, and anodic and cathodic degassed liquid conduit openings 48a and 48b. Anodic cell plate 20a and cathodic cell plate 20b also comprise anodic or cathodic gas-liquid channels 106a or 106b and anodic or cathodic degassed liquid channels 108a or 108b. Gas-liquid channels 106 connect electrolysis chamber openings 28 to at least one gas-liquid conduit opening 44 and at least one degassed liquid conduit opening 48 respectively. Cell plate 20 also defines outer cell plate rim 32 and inner electrolysis chamber rim 160.

Gas-liquid conduit openings 44 form continuous gas-liquid conduits 46 when cell plates are arranged together with other cell plates. Referring to FIG. 4, gas-liquid conduit opening 44a forms gas-liquid mixture conduit 46a and is in direct communication with anodic electrolysis chamber opening 28a through gas-liquid channel 106a. Similarly, FIG. 5 shows that gas-liquid conduit opening 44b forms gas-liquid conduit 46b and is in direct communication with cathodic electrolysis chamber opening 28b through gas-liquid channel 106b. Gas-liquid mixture channels 106 function to receive and transfer gas-liquid mixture from the respective electrolysis chambers to gas-liquid conduit 46. Gas-liquid conduits 46 function to receive gas-liquid mixtures from electrolysis chambers 82 and transfer the gas-liquid mixtures to an end of the electrolyser module. It should be noted that gas-liquid mixture conduit openings 44 are not in direct communication with degassing chamber openings 30 through each cell plate 20.

Cell plates 20 further define degassed liquid conduit openings 48 which form degassed liquid conduits 52 when cell plates are arranged together with other cell plates. As shown in FIG. 4, degassed liquid conduit opening 48a is in direct communication with anodic electrolysis chamber opening 28a through degassed liquid channel 108a and FIG. 5 shows that degassed liquid conduit opening 48b is in direct communication with cathodic electrolysis opening 28b through degassed liquid channel 108b. Degassed liquid conduits 52 function to receive degassed liquid from degassing chambers 50 and transfer it to electrolysis chambers 82 via degassed liquid channels 108.

The thickness of cell plate 20 as measured between its opposing surfaces may range depending on the application but must be sufficient to accommodate gas-liquid mixture channel 106 and degassed liquid channel 108. For example, for water electrolysis, the thickness may be in the range of 0.2 to 1.5 cm and more preferably 0.4 to 1.0 cm.

Cell plate 20 may be conveniently designed so that anodic cell plate 20a may become cathodic cell plate 20b by flipping it around so that it is in the opposite orientation. In this alternative embodiment, anodic and cathodic cell plates 20a and 20b have identical grooves or connecting surfaces 110 on opposing surfaces to allow the plates to be arranged in sealing engagement in whichever orientation that they are arranged.

The plates preferably are made of a suitable polymeric material that is inert to liquid such as electrolyte, and more preferably is a thermoplastic material such as polyphenylene sulphide, polyphenylene oxide and the like and in particular polysulphone. Thermoset materials may also be used. The plates may be manufactured by conventional molding techniques, such as injection molding or blow molding, or by conventional machining techniques, such as stamping or die cutting, with drilling and plugging used to form openings, channels, and end walls. It is contemplated that plates may also be formed in multiple portions that interconnect to form a complete plate, such as two halves that each define half channels and openings for forming channels and openings when the plates are placed together. Further openings may be defined within the plate in order to decrease the amount of material needed and the weight of the plates provided that the structural integrity of the plates is sufficiently maintained.

Electrolysis chamber 28 is located preferably at the bottom portion of electrolyser module 18. When cell plates 20 are arranged in general vertical planes as they are shown in FIGS. 1 and 2, electrolysis chamber opening 28 is located generally lower than degassing chamber openings 30, although this is not essential to the invention. The distance between the outer cell plate rim 32 of cell plate 20 and the electrolysis chamber rim 160 should be sufficient at its narrowest point so that that there is enough material between outer cell plate rim 32 and the inner electrolysis chamber rim 160 to maintain its integrity at a normal internal operating pressure of the module, for example, at least 10 bar.

The plates are arranged in such manner that all chamber openings and conduit openings (as described above) together define respective chambers and conduits. The portion of the surface of the plate that is in contact with a neighboring plate is referred to as a "connecting surface". Cell plates 20, end plates 22 (included as a cell plate when cell plates are referred to as being together), transfer plates 24 and 26, and return plate 42 (described below) all have connecting surfaces 110 which come into contact with connecting surfaces 110 of neighboring plates when the plates are arranged together.

The cell plates, transfer plates, and return plates of the electrolyser module are arranged in sealing engagement in order to prevent leakage of gas and liquid. As used herein, the term "sealing engagement" refers to the interaction between the connecting surfaces of neighboring plates in an arrangement of plates in an electrolyser module wherein the liquid used inside the electrolyser module and the gas-liquid mixtures and gases generated within the electrolyser module are prevented from leaking from the chambers, conduits, or channels in which they are contained. Sealing methods known in the art including those described herein may be used to prevent such leakage.

The size and shape of the degassing chambers 50 are such that adequate degassing of the gas-liquid mixture can occur. The shape of these degassing chamber openings 30 may vary. They are preferably circular resulting in a cylindrical internal degassing chamber when multiple cell plates 20 are arranged together, but could also be elliptical or of any other shape. Rounded shapes, that is, shapes without corners are preferred.

In a preferred embodiment, circular degassing chamber openings 30 are preferred for ease of fabrication, end assembly, and also to avoid stress concentrations. The degassing chamber openings 30 can have a diameter of at least about 5 cm, more preferably at least about 10 cm, and most preferably at least 12 cm. The diameters are dependent on the amount of the gas-liquid mixture that will be generated. The amount of gas-liquid mixture generated is directly related to the diameter of the electrode, the gas production rate, and the number of cells in the electrolyser module. Table 1 shows dimensions of openings of the preferred embodiment based on a current test model of an electrolyser module operating at 10 bar, 4 kA/m$^2$, 70° C., with a 34% KOH aqueous electrolyte solution.

The size of the openings 30 may also vary, but typically they will be larger than that of the opening or openings 44 and 48 forming the conduits 46 and 52 and less than the electrolysis chamber opening 28. Preferably the size is selected such that the volume of the degassing chambers 50 is big enough to effectively degas the gas-liquid mixtures while being of a practical size for manufacturing and pressurization considerations.

The conduit openings 44 and 48 are preferably circular shaped having a diameter in the range of from 0.8 cm to 3.0 cm, preferably in the range of from 1.0 cm to 2.0 cm, and more preferably in the range of from about 1.3 cm to 1.8 cm.

Electrolyser module 18 further includes transfer plates 24 and 26 which are provided for transferring gas-liquid mixture from gas-liquid mixture conduits 46a and 46b to the respective degassing chambers 50a and 50b.

Figure 6:
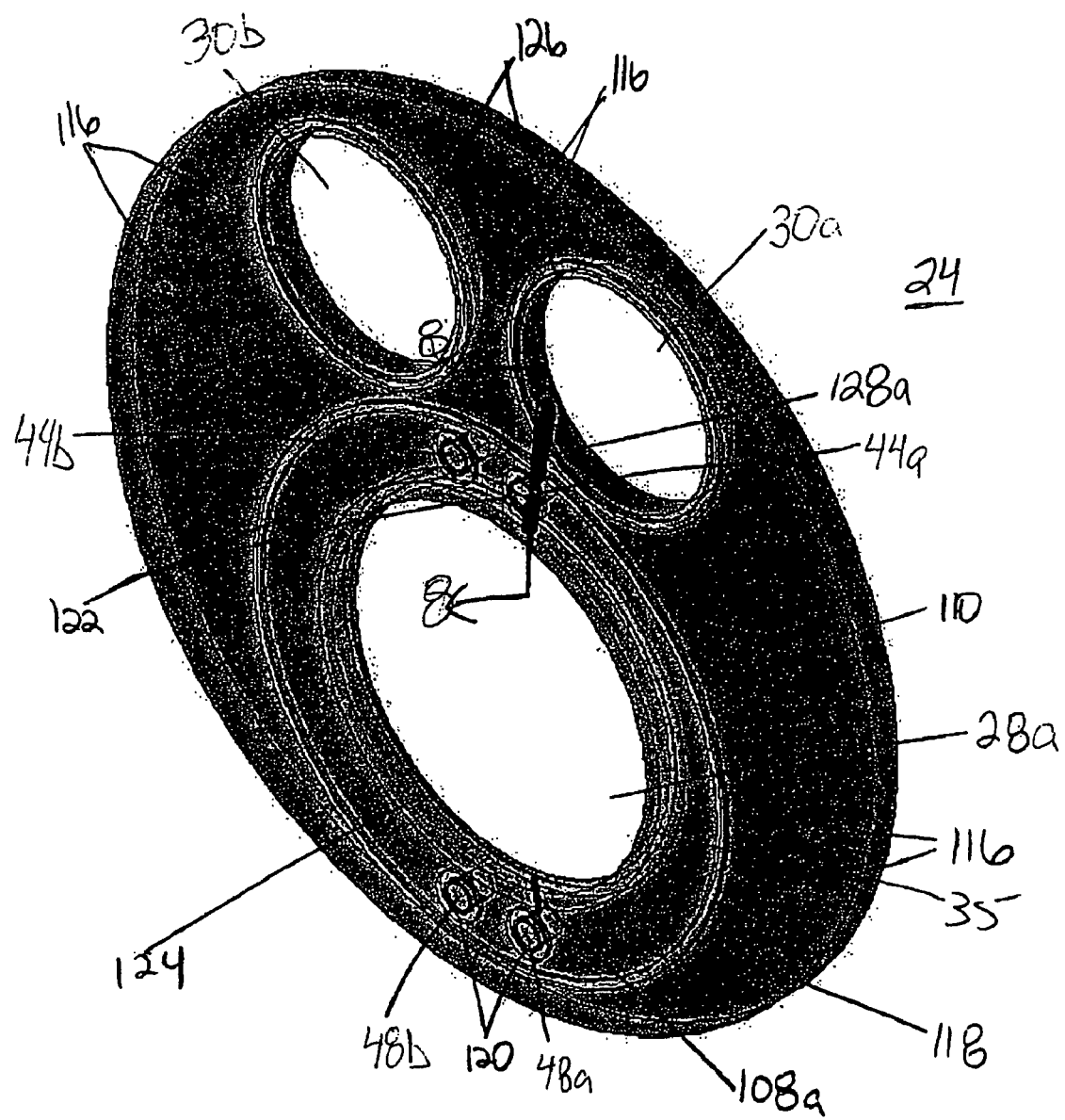
FIG. 6 shows a perspective view of an anodic transfer plate for the electrolyser module shown in FIG. 1.
Figure 7:
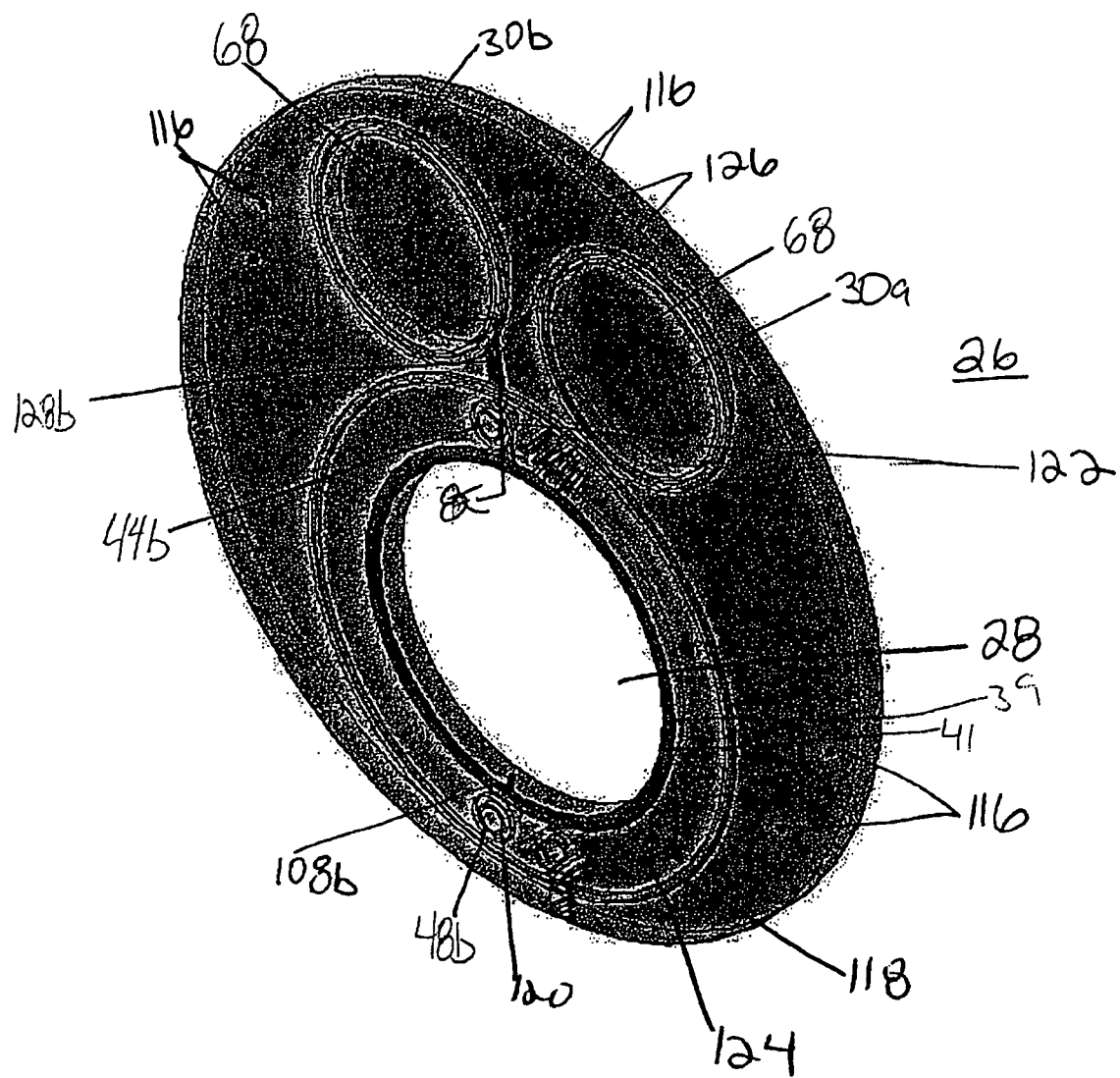
FIG. 7 shows a perspective view of a cathodic transfer plate for the electrolyser module shown in FIG. 1.
Figure 8:
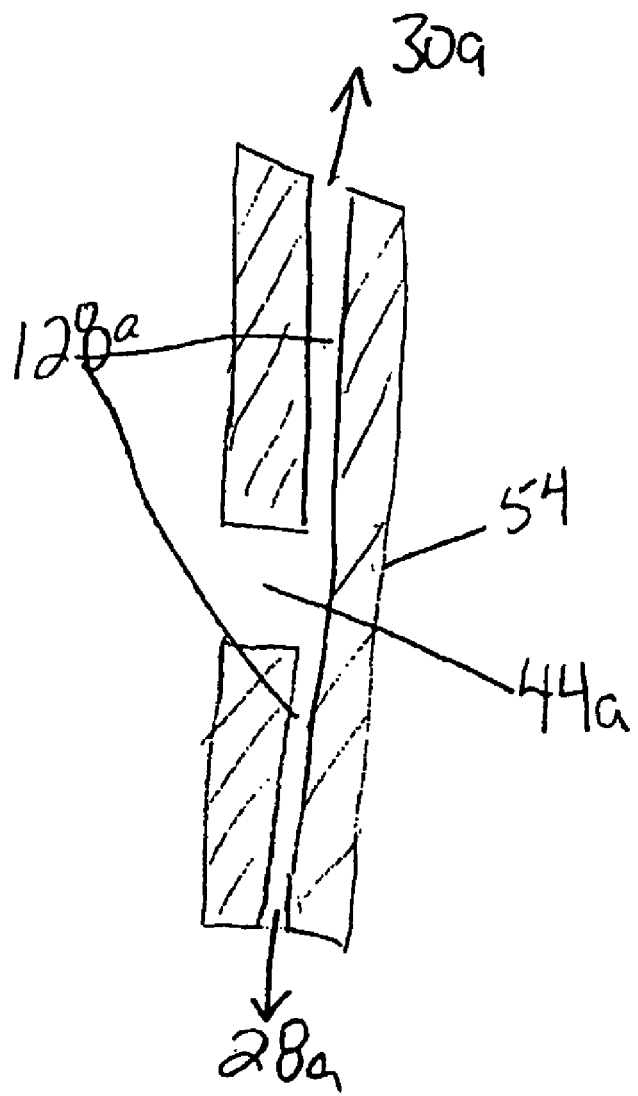
FIG. 8 shows a sectional view of the gas-liquid transfer channel for the anodic and cathodic transfer plate of FIGS. 6 and 7 as viewed along lines 8-8.

FIGS. 6 and 7 show perspective views of the first surfaces of anodic transfer plate 24 and cathodic transfer plate 26. Anodic transfer plate 24 allows the transfer of gas-liquid mixture from gas-liquid conduit 46a to anodic degassing chamber 50a. Cathodic transfer plate 26 allows the transfer of gas-liquid mixture from gas-liquid conduit 46b to cathodic degassing chamber 50b. In this embodiment, anodic and cathodic transfer plates 24 and 26 have first and second generally planar opposing surfaces and define electrolysis chamber openings 28, anodic and cathodic degassing chamber openings 30a and 30b, anodic and cathodic gas-liquid conduit openings 44a and 44b, anodic and cathodic degassed liquid conduit openings 48a and 48b, degassed liquid transfer channels 108, bipolar plate notch 35, anode plate notch 35, membrane notch 39, and cathode plate notch 41 as defined above. Anodic transfer plate 24 further comprises gas-liquid conduit end wall 54 which forms an end of gas-liquid conduit 46a and degassed liquid conduit an end wall (not shown) which forms an end to degassed liquid conduit 48a. Anodic transfer plate 24 further defines gas-liquid transfer channel 128a which is in direct communication with anodic electrolysis chamber opening 28a, anodic gas-liquid conduit opening 44a, and anodic degassing chamber opening 30a, as shown in more detail in FIG. 8. Similarly, cathodic transfer plate 26 further defines gas-liquid transfer channel 128b which is in direct communication with electrolysis chamber opening 28b, cathodic gas-liquid conduit opening 44b and cathodic degassing chamber opening 30b. Gas-liquid transfer channels 128 function to transfer gas-liquid mixture from gas-liquid conduits 46 to degassing chambers 50.

In order to conduct electric current through head flange 134 to cathode plate 40 of cathode transfer plate 26 via the conductive connector 37, conductive material may be used which extends through head flange 134 from one generally planar surface of head flange 134 to the opposing surface. The conductive material may be in the form of a conductive plate defined within head flange 134, or may be metal fibers which extend from one surface of head flange 134 to the other. The conductive material (not shown) is connected to a power supply on one end and in contact with conductive connector 37 on the other. Optionally, the whole of head flange 134 may be made of a conductive material.

For maintaining current efficiency of the electrolyser module, the electrolyte should not make contact with any charged conductive material other than at anode plate 36, cathode plate 40, bipolar plate 34, and conductive connector 37. Therefore, the portions of the cell plates 20, end plate 22, transfer plates 24 and 26, and return plate 42 which come in contact with the electrolyte are preferably made with a non-conductive material such as polysulphone. Also, it is preferable that anywhere that there is contact between cathodic transfer plate 26 and conductive head flange 134 other than at the conductive portion of head flange 134 which engages connector 37, that a barrier of a non-conductive material such as polysulphone is used. Such a barrier is not necessary when cathodic transfer plate 26 is made of a non-conductive material.

In alternative embodiments, anodic and cathodic transfer plates 24 and 26 may define gas-liquid transfer channels 106 or a channel (not shown) which connects electrolysis chamber openings 28 directly to anode or cathode degassing chamber openings 30. In these cases, anodic and cathodic transfer plates 24 and 26 may comprise a gas-liquid transfer channel (not shown) which connects gas-liquid conduit openings 44 directly to degassing chamber openings 30.

In a further alternative embodiment, anodic transfer plates 24 and 26 may exclude electrolysis chamber opening 28 and degassed liquid conduit openings 48 and instead may define only gas-liquid conduit openings 44, degassing chamber openings 30, and a channel connecting the two. In this embodiment, the anodic transfer plate 24 may further define a cathodic gas-liquid conduit opening and a cathodic degassing chamber opening in order to be arranged with a cathodic transfer plate, which also may not define a cathodic electrolysis chamber opening and degassed liquid conduit openings. In this alternative embodiment, electrical conduction must be provided between the head flange which is connected to the power supply and the nearest electrolysis chamber. This may be provided with a conductive material, such as metallic threads, which connects the bead flange to the bipolar plate, an electrode, or other conductive material of the nearest electrolysis chamber.

Cathodic transfer plate 26 further comprises degassing chamber end walls 68 which form ends of degassing chambers 50a and 50b and gas-liquid conduit end wall 54 which forms an end of gas-liquid mixture conduit 44b, and degassed liquid conduit opening 48b further comprises an end wall (not shown) which forms an end to degassed liquid conduit 52b. Degassing chamber end walls 68 need only be defined in cathodic transfer plate 26 if degassing chamber opening 50a of anodic transfer plate 24 extends beyond anodic transfer plate 24 to cathodic transfer plate 26.

It will be recognized by one skilled in the art that transfer plates 24 and 26 could function as anodic or cathodic transfer plates depending on whether they comprise anodic or cathodic electrolysis chamber 82a or 82b.

Figure 12:
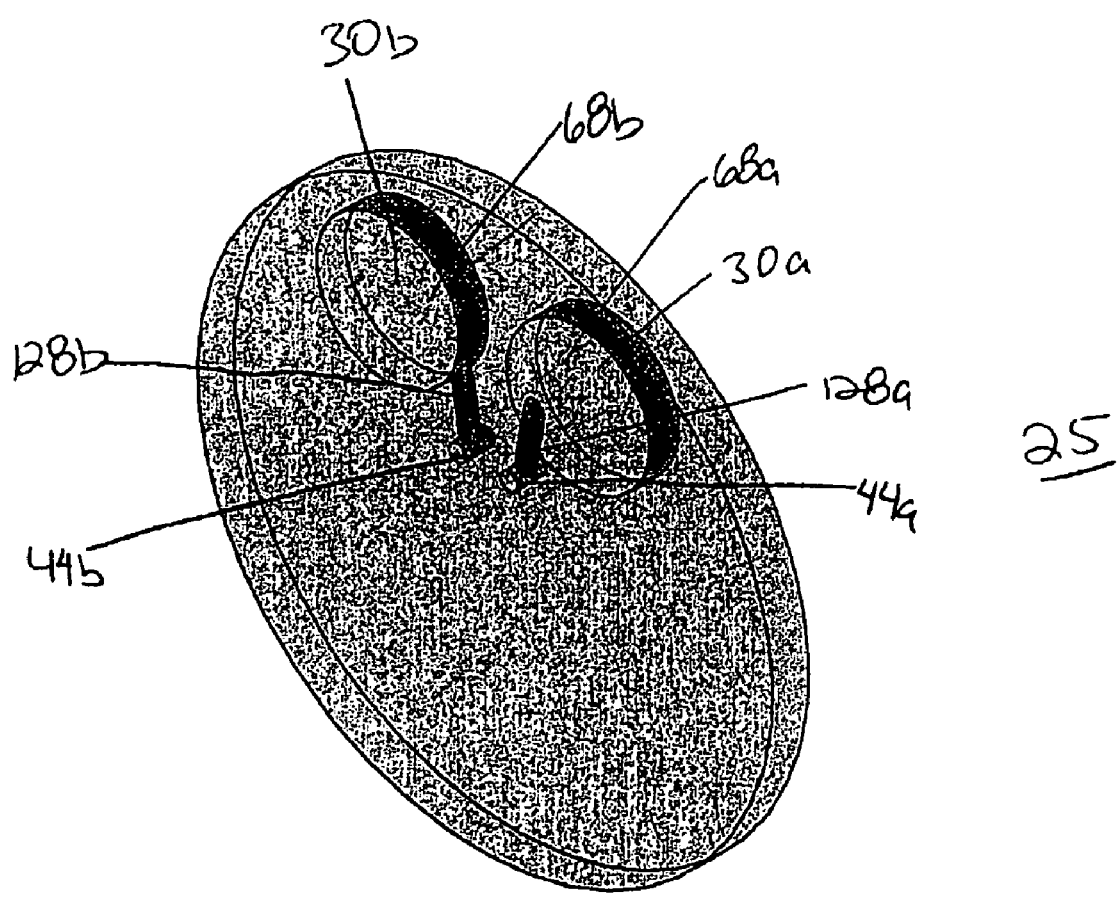
FIG. 12 shows a perspective view of an alternative embodiment of a transfer plate for the electrolyser module shown in FIG. 1.

FIG. 12 shows a further alternative embodiment to anodic transfer plate 24 and cathodic transfer plate 26. Transfer plate 25 is a single transfer plate and may replace anodic and cathodic transfer plates 24 and 26. Transfer plate 25 defines gas-liquid conduit openings 44, degassing chamber openings 30, end walls 68 which form ends to degassing chambers 50, and gas-liquid transfer channels 128 which connect the gas liquid conduit openings 44 to degassing chamber openings 30. As described above, conductive means may be provided with transfer plate 25 in order to transfer electric current from the power supply connected to the end of the electrolyser module to the bipolar plate associated with cell plate 20 which is arranged with transfer plate 25. Such conductive means may include a conductive material disposed within an opening (not shown) which is defined in transfer plate 25 in order to connect the neighboring electrode to the power supply. Alternatively, metal fibers could be disposed through the thickness of the plate in order to connect the neighboring electrode to the power supply.

Electrolyser module 18 shown in FIG. 1 further includes return plate 42 which facilitates the return of degassed liquid from degassing chambers 50 to the electrolysis chambers 82. Return plate 42 defines degassing chamber transfer openings 78a and 78b which form part of degassing chambers 50a and 50b respectively.

FIG. 9 shows a perspective view of return plate 42. Return plate 42 further defines degassed liquid transfer conduit openings 132a and 132b, which form part of degassed liquid conduits 52a and 52b respectively. Return plate 42 comprises gas outlet openings 140 and optionally liquid feed inlet openings 138 and further comprises one or more degassed liquid transfer channels 112 (112a and 112b) which are integral to return plate 42. Return plate 42 may further comprise openings (not shown) to receive equipment for detecting and/or regulating such parameters of the electrolyser module as liquid level, temperature, and/or pressure. Degassed liquid transfer channels 112 connect degassing chamber transfer openings 78 to degassed liquid transfer conduit openings 132 respectively. Degassed liquid transfer conduits 112 thereby connect degassing chambers 50 to degassed liquid conduits 52 respectively to facilitate the transfer of degassed liquid therebetween. In this manner, degassed liquid transfer conduits 112 maximize the pressure head available to facilitate natural fluid circulation in the electrolyser module without necessarily requiring mechanical pumping over the typical operating pressure range of, for example, 0 to at least 10 bar. However, note that optionally, provision can be made for inclusion of external mechanical pumps to circulate the degassed liquid back to the electrolysis chambers 50. Further note that any such external circulation circuit also could include liquid cooling. Alternatively, if an external pumped circulation loop is not included, then cooling of the degassed liquids in the internal degassing chambers is preferably achieved by installing cooling lines (not shown) that extend into degassing chambers 50, for example, via return plate 42. Cooling lines could be also be integrally formed within degassed liquid transfer conduits 112.

Return plate 42 may also comprise pressure equalization conduit 136 which connects degassing chamber openings 78a and 78b and therefore effectively connects degassing chambers 50a and 50b in order to maintain equalization of the respective pressures in the degassing chambers 50. Optionally, such a pressure equalization conduit could be located in an independent plate at other points in the module.

Optionally, return plate 42 may function as a bipolar plate between cells where an anode plate 36 and a cathode plate 40 are arranged on opposing sides of return plate 42. In such a case, all of or portions of return plate 42 may be made of a conductive material such as nickel-plated steel to allow electric contact between anode plate 36 and cathode plate 40. Alternatively, return plate 42 may be made generally of a non-conducting material and electric contact between anode plate 36 and cathode plate 40 may be achieved by a conductive material, such as woven metallic wire, joined to each electrode through return plate 42. Return plate 42 may optionally be connected to external sensing and control devices such as liquid level sensors, thermocouples for regulating temperature, and pressure transducers. Return plate 42 is preferably electrically grounded for safety. For example, return plate 42 may be electrically connected to the ground of the power supply unit. Optionally, additional return plates could be used at intermediate points along the length of the electrolyser module to accommodate additional features and/or to improve the structural integrity of the electrolyser module.

Return plate 42 may form an end of an electrolyser module instead of being disposed with cells arranged on either side. In such a case, degassing chamber transfer openings 78 and degassed liquid conduits 132 may be sealed with end walls (not shown) on one side in order to form ends to degassing chambers 50a and 50b and degassed liquid conduits 52.

Return plate 42 may be hollow in order decrease its overall weight. It may have grooves or elevations and depressions on its connecting surface as described below to allow it to be arranged in sealing engagement with other cell plates of the invention. Return plate 42 need not have the same diameter as other plates of the electrolyser module, and may have a smaller or larger diameter depending on its functionality. It also need not be the same thickness as the other plates of the electrolyser module.

Depending on the functionalities required, return plate 42 can be made of electrically conducting or non-conducting materials, or combinations thereof (e.g., metals, plated metals, coated metals, polymers, reinforced polymers, etc.), and different areas or sections of the plates can be made of different materials. For example, return plate 42 may be made of nickel-plated steel.

Electrolyser module 18 includes end plate 22 which is used to define an end of gas-liquid mixture conduits 46 is shown in FIGS. 10a and 10b. FIG. 10a is a perspective view of a first side of end plate 22. End plate 22 is similar to cell plate 20, and defines electrolysis chamber opening 28, degassing chamber openings 30, at least one gas-liquid conduit opening 44, degassed liquid conduit openings 48, and anode plate notch 33. End plate 22 may further define gas-liquid conduit end walls 146 which form ends to gas-liquid mixture conduits. End plate 22 is used when arranged in sealing engagement with return plate 42. End plate 22 does not require bipolar plate notch 35 when return plate 42 functions as a bipolar plate.

In alternative embodiments, a cell plate 20 which is arranged together with end plate 22 may comprise an end wall which ends one or more gas-liquid conduits 46. Such an end wall may be used if the one or more gas-liquid conduits 46 need not extend to end plate 22.

Electrolyser module 18 shown in FIG. 1 as arrangement 100 represents a portion of an electrolyser module. Additional cell plates 20 can be arranged which mirror arrangement 100 and extend from the other side of return plate 42. In one embodiment, the electrolyser module is held together between head flange 134 and another flange at the other end of the electrolyser module (not shown). The head flanges are preferably made of metal. The flanges may be held together with several tie rods (not shown) placed at the outside of the electrolyser module. Alternatively, openings 116 as described below may be defined in the plates to accept the tie rods in order to link the plates. In alternative embodiments, degassing chamber openings without end walls may be defined in anodic and/or cathodic transfer plates 24 and 26 and head flange 134 can be adapted to end the degassing chambers.

In an alternative embodiment, a plurality of electrolyser module subunits may be arranged in one electrolyser module, where a subunit of an electrolyser module refers to an arrangement comprising anodic and cathodic transfer plates 24 and 26 at one end and end plate 22 and return plate 42 at the other end with a plurality of cell plates 20 arranged therebetween. In an electrolyser module which comprises more than one electrolyser module subunit, return plate 42 of one subunit may be adjacent to cathodic transfer plate 26 of a neighboring subunit.

An alternative embodiment of an electrolyser module wherein the electrolysis chamber, degassing chamber and conduits interconnecting same are not integrally formed within a cell plate is also contemplated.

The diameter of electrolysis chamber opening 28 depends on the desired volume of the electrolysis chambers and hence the scale of the electrolysis process. In a standard electrolyser module having circular openings, the diameter of electrolysis opening 28 may be in the range of 5 cm and 2 m. The size of electrolysis chamber opening 28 often is expressed in terms of surface area, i.e., the surface circumscribed by the opening. Expressed in this manner, preferable inner sizes may range between 25 and 40000 $cm^2$. For compact electrolyser modules, for example, for home fueling applications the size will be about 150 to about 300 $cm^2$.

The width of the electrolyser module depends on the size of the openings in the plates, in particular of the size of degassing chamber openings 30, and of the positioning of the various openings in the plates. The length of the electrolyser module depends on the number of plates used to form the electrolyser module.

The gas-liquid mixture channels 106 and degassing channels 108 preferably have a relatively small diameter that is less than the thickness of the plate, for example in the range of from 0.5 to 5 mm, more preferably from 0.5 to 3 mm, and more preferably in the range from about 1 to 2 mm. Preferably, the diameter of the channels 106, 108, and 128, which are responsible for the transfer of gas-liquid mixture or degassed liquid should be larger than that of any channels 140 for removal of gases.

Cell plates 20, end plate 22, transfer plates 24 and 26, and return plate 42 optionally define openings 116 for receiving tie rods (not shown) which are used for securing an arrangement of plates. A plurality of openings 116 may be defined at various locations of cell plate 20 as shown, including the periphery and also through more centralized regions of cell plate 20.

Sealing between the plates is important to prevent leakage of gas and liquid. Cell plates 20, end plate 22, transfer plates 24 and 26, and return plate 42 may further define grooves 118, 120, 122, 124, and 126 on their connecting surfaces 110 on both sides. The grooves are used to support conventional o-ring type gaskets (not shown), thereby securing a liquid and gas-tight connection, or sealing engagement between two neighboring plates. Such gaskets may be made of various materials, sizes and shapes. Flat gasket seals also can be used which are made of, for example, a suitable chemically resistant and elastic material, such as polytetrafluoroethylene. For example, with reference to the ring-shaped cell plates 20 of FIGS. 4 and 5, a ring-shaped flat gasket made of polytetrafluoroethylene having a uniform thickness in the range of 0.2 to 1 mm, preferably about 0.5 mm, may be used.

In an alternative embodiment, such gaskets can be used in conjunction with nesting surfaces such as fine elevations and depressions defined in the plates around the various openings, as well as around the periphery of the plates as described in U.S. Pat. No. 6,554,978, which is incorporated herein by reference. The elevations and depressions may be of various shapes where the elevations on the surface of one plate fit into the depressions on the surface of the neighbouring plate. For example, the connecting surface of a ring-shaped plate may have a series of small elevations and depressions giving part of the connecting surface 110 a milled aspect, the elevations and depressions having a triangular shape, whereby a cross-section of the surface has a saw-tooth aspect (not shown). The distance between each elevation (and hence between each depression) may vary, for example it may be in the range of 0.5 to 3 mm, preferably about 1 mm, and the distance between the top of an elevation and the bottom of a depression may vary too, for example it may be in the range high of 0.5 to 3 mm. These are only examples of possible sealing methods, and the scope of the invention is not limited to the methods described herein.

In still other embodiments, the gasket may be a flat ring made of a synthetic material and may be pressed between the milled surfaces of two neighboring plates. It preferably is sized equal to, or slightly smaller than the flat surface of the plates. In the latter instance the gasket's outer side lies within a small distance of the outer side of the plate, for example 2 mm. Preferably the flat gasket covers the surface formed by the elevations/depressions in the ring.

In some embodiments, the elevations/depressions cover about the whole connecting surface of the plate, preferably except for a small section at the outer and inner rims of the plate, in particular ending at least 2 or 3 mm from the plate's edge. A series of elevations/depressions may also be positioned concentrically around the conduit openings.

FIG. 13 shows an alternative embodiment of a sealing mechanism for electrolyser module 18. Cell plates 20a and 20b are shown arranged beside each other with anode plate 36, membrane 38, and cathode plate 40 disposed therebetween and supported on respective notches, 33, 39, and 41. Bipolar plate 34 is supported by bipolar notch 35 of anodic cell plate 20a. In this embodiment, flat rings 43 are disposed between the cell plates. Flat rings 43 form a circle with about the same outer diameter as the cell plates and are arranged so that they engage the outer part of the planar surfaces of the cell plates. Flat rings 43 are made of synthetic materials known in the art including those described herein. Flat ring 43 has an inner diameter such that it presses against a portion of membrane 38 or bipolar plate 34 when the cell plates are arranged together in order to further support membrane 38 and bipolar 34.

FIG. 11 is a schematic vertical sectional view of an electrolyser module according to an embodiment of the invention in which there is an arrangement of plates on both sides of return plate 42.

The electrolyser module has a first side A and a second side B with return plate 42 being in the middle. As such, return plate 42 of the electrolyser module has a first side 42A and a second side 42B. Each side A and B is electrically connected to power supply 190. Power supply 190 may be a transformer/rectifier which supplies direct current (DC) to the electrolyser module. Return plate 42 has an end plate 22 arranged in sealing engagement each on first side 42A and on second side 42B. Each end plate 22 is arranged with its second side in sealing engagement with one side of return plate 42. In this embodiment, return plate 42 functions as a bipolar plate as described above. On second side 42B of return plate 42, end plate 22 comprises anodic electrolysis chamber 82a, and therefore functions as anodic end plate 22a. On first side 42A of return plate 42, end plate 22 comprises cathodic electrolysis chamber 82b, and therefore functions as cathodic end plate 22b. The cell plates 20 which are arranged after each end plate 22, and extending from return plate 42, alternate so that, for example, cathodic cell plate 20b is arranged beside anodic end plate 22a.

Gas-liquid mixtures are identified as GL and represented by dashed lines or dashed arrows, degassed liquid is identified as L and represented by solid lines or arrows, and gas is identified as G and represented by dotted lines or arrows. Gas-liquid mixture GL, degassed liquid L, and gas G are relative terms. Gas-liquid mixture GL is the mixture which is collected in gas-liquid mixture conduits 46. Degassed liquid L is defined as having a lesser concentration of gas relative to gas-liquid mixture GL, and gas G is defined as having a lesser concentration of liquid relative to gas-liquid mixture GL.

During operation of the electrolyser module, with respect to operation of the anode electrolysis chambers 82a, gas-liquid mixtures GL are produced when gas is generated on anode plate 36 (not shown) as a result of electrolysis of the liquid. The gas-liquid mixture GL flows from the individual anodic electrolysis chambers through gas-liquid mixture channels 106a and into gas-liquid conduit 46a as a result of the lower density of the gas-liquid mixture GL with respect to the liquid L and as a result of the overall flow of the electrolyser module. Referring to second side B of the electrolyser module, gas-liquid mixture GL flows to second end B of gas-liquid conduit 46a to gas-liquid transfer channel 128a, through which it enters degassing chamber 50a. The gas-liquid mixture GL forms a pool P which resides on the bottom part of degassing chamber 50a, and which has a transitional surface PS above which is mainly gas G which has evolved from the gas-liquid mixture GL and below which is mainly gas-liquid mixture GL. From that entrance point of degassing chamber 50a, the gas-liquid mixture flows to return plate 42. As it follows this path, gas G is continuously evolved from the gas-liquid mixture. The separated gas G flows out of degassing chamber 50a via gas outlet channel 140 to, for example, downstream gas conditioning operations (e.g., optionally rinsing/demisting, catalytic purification, drying and/or compression), and then, for example, to user applications. The degassed liquid L flows from degassing chamber 50a, downward through degassed liquid transfer conduit 112a into degassed liquid conduits 52a, and then upward into each of the individual anode electrolysis chambers 82a via degassed liquid channels 108a. Note that optionally, provision can be made for inclusion of an external mechanical pump or pumps to aid in recycling of the degassed liquid from the degassed liquid conduits 112 of return plate 42 into degassed liquid conduits 52. The foregoing description applies as well to the left side of the electrolyser module, except the gas-liquid mixture GL collected in gas-liquid conduit 46a is transferred to degassing chamber 50a via gas-liquid mixture channel 128b of anodic transfer plate 26a.

The long path from the introduction to the internal degassing chamber from anodic and/or cathodic transfer plates 24 and 26 to a central point where the gas is released allows optimum residence time and surface area for the gas to separate from the gas-liquid mixture.

As described above, once the gas-liquid mixture GL is introduced to degassing chambers 50 it forms pool P which is generally closer to the bottom than the top of degassing chamber 50 when the electrolyser module is oriented as shown in FIGS. 1 and 2 and which flows towards return plate 42 as described above. The gas-liquid mixtures can be introduced into degassing chamber 50a or 50b from gas-liquid mixture transfer channels 128a and 128b either below or above the transitional surface PS depending on the particular operating conditions of the electrolyser module. The latter method of introducing the gas-liquid mixtures provides a break in the continuity of the liquid path; however, the long fluid flow path and elimination of exposed metal sections in the degassing chamber, as compared to degassing chambers of the prior art, minimizes stray current flows and ensures good current efficiency for the water electrolysis reactions, making introduction of the gas-liquid mixtures above the transitional surface unnecessary.

FIG. 14 shows a schematic diagram of an electrolyser system of the present invention. The electrolyser module is shown generally as 18. It is connected to power source 190 at either end of electrolyser module 18. A feed water source 195 is connected to electrolyser module 18 or, optionally, the feed water may be purified at the water purification unit 191 which is connected to feed water source 195 and electrolyser module 18. The purified feed water would then be transferred from water purification unit 191 to electrolyser module 18. The electrolyser system may further comprise a gas conditioning unit 192 which receives evolved gas from electrolyser module 18. The electrolyser system may also further comprise a compressor 193 which is connected to gas conditioning unit 192 and compresses the gas received from it. A storage unit and dispenser 194 may also be included in the electrolyser system. Storage unit and dispenser 194 is connected to and receives compressed gas from compressor 193 and stores the gas until it is needed. When the gas is needed, storage unit and dispenser 194 facilitates the dispensing of the gas to a user 196. User 196 may be, for example, a hydrogen powered vehicle or an electricity generator. Optionally, electrolyser module 18 and/or gas conditioning unit 192 may further comprise compressing means, in which case, user 196 may receive compressed gas directly from electrolyser module 18 or gas conditioning unit 192. If uncompressed gas is desired, user 196 may receive it from electrolyser module 18 or gas conditioning unit 192 directly.

A process for separating a gas-liquid mixture generated within an electrolyser module is also provided as part of the invention described herein. The electrolyser module has at least one degassing chamber, at least one electrolysis chamber, at least one gas-liquid conduit, and at least one degassed liquid conduit. The process comprises generating a gas-liquid mixture at an electrode disposed within the electrolysis cell, transferring the gas-liquid mixture to the at least one gas-liquid conduit, transferring the gas-liquid mixture from the gas-liquid conduit to a first end of the degassing chamber and allowing gas to evolve from the gas-liquid mixture within the degassing chamber to form a degassed liquid, transferring the degassed liquid from a second end of the degassing chamber to the at least one degassed liquid conduit, and transferring the degassed liquid from the at least one degassed liquid conduit to the at least one electrolysis chamber.

The present electrolyser modules can be used in the production of various gases, for example chlorine and hydrogen by the electrolysis of brine, or oxygen and hydrogen in case of the electrolysis of water. The preferred embodiment of the invention concerns the electrolysis of water where the hydrogen-liquid and oxygen-liquid mixtures are generated in the respective electrolysis chambers.

It is contemplated that the electrolyser module of the present invention be used for high pressure applications.

The foregoing description of the preferred embodiments of the processes and apparatus of the invention have been presented to illustrate the principles of the invention and not to limit the invention to the particular embodiment illustrated. It is intended that the scope of the invention be defined by all of the embodiments encompassed within the claims and/or their equivalents.

TABLE 1

| Name | Number | Value (cm) |
| --- | --- | --- |
| Electrolysis Chamber Opening | 28 | 19.54 |
| Gas-liquid Mixture Transfer Channel | 128 | 0.6 |
| Gas Outlet Channel | 140 | 1.45 |
| Degassing Chamber Opening | 30 | 12 |
| Degassed Liquid Opening Channel | 48 | 1.45 |
| Gas-liquid Conduit Opening | 44 | 1.45 |
| Gas-liquid Channel | 106 | 0.2 |
| Degassed Liquid Channel | 108 | 0.3 |

The invention claimed is:

1. An electrolyser module comprising:
    (a) a plurality of cell plates adapted to be arranged together in sealing engagement to define at least one electrolysis cell, at least one degassing chamber, at least one gas-liquid conduit, and at least one gas-liquid channel connecting said at least one electrolysis cell to said at least one gas-liquid conduit;
    (b) at least one transfer channel for connecting said gas-liquid conduit to said at least one degassing chamber;
    (c) at least one gas outlet conduit for connecting said at least one degassing chamber to a desired location for receiving gas and at least one degassed liquid conduit for connecting said at least one degassing chamber to a desired location for receiving degassed liquid; and
    (d) a transfer plate, said transfer plate comprising a body, at least one electrolysis chamber opening defined in said body, at least one degassing chamber opening defined in said body, at least one gas-liquid conduit opening defined in said body, and a channel which connects the at least one gas-liquid conduit opening to the at least one degassing chamber opening.

2. The electrolyser module of claim 1 wherein the cell plates comprise:
    (a) a body;
    (b) at least one electrolysis chamber opening defined in said body;
    (c) at least one degassing chamber opening defined in said body;
    (d) at least one gas-liquid conduit opening defined in said body; and
    (e) a channel defined in the body which connects the at least one electrolysis chamber opening to the at least one gas-liquid conduit opening.

3. The electrolyser module of claim 1, said transfer plate having a non-rectilinear peripheral shape.

4. The electrolyser module of claim 1, wherein the transfer plate is comprised substantially of a thermoplastic material.

5. The electrolyser module of claim 1, further comprising a return plate, said return plate comprising:
    (a) a body;
    (b) at least one degassing chamber opening defined in said body;
    (c) at least one degassed liquid conduit opening defined in said body;
    (d) a channel which connects the at least one degassing chamber opening to the at least one degassed liquid conduit opening.

6. The electrolyser module of claim 5, wherein at least a portion of the return plate is comprised of a conductive material.

7. The electrolyser module of claim 5, wherein the return plate comprises a bipolar plate.

8. The electrolyser module of claim 5, wherein the return plate further comprises a pressure equalization conduit.

9. The electrolyser module as claimed in claim 1, wherein said at least one transfer channel is connected proximate to an end of said at least one gas-liquid conduit.

10. The electrolyser module as claimed in claim 1, wherein said at least one transfer channel is connected proximate to an end of said at least one degassing chamber.

11. The electrolyser module as claimed in claim 1, wherein said at least one transfer channel has one end that is connected proximate to an end of said at least one gas-liquid conduit and another end that is connected proximate to an end of said at least one degassing chamber.

12. The electrolyser module as claimed in claim 1, further comprising at least one gasket disposed between said cell plates.

13. The electrolyser module as claimed in claim 1, wherein each of said cell plates define nesting surfaces for nesting with adjacent said cell plates.

14. The electrolyser module as claimed in claim 1, said electrolyser module further comprising a pressure equalization conduit.

15. An electrolyser system comprising the electrolyser module as claimed in claim 1 in combination with a power supply system.

16. An electrolyser system comprising the electrolyser module as claimed in claim 1 in combination with a water purification system.

17. An electrolyser system comprising the electrolyser module as claimed in claim 1 in combination with a gas compression system.

18. An electrolyser system comprising the electrolyser module as claimed in claim 1 in combination with a gas storage system.

19. An electrolyser system as claimed in claim 18 further comprising a gas dispensing system connected to said gas storage system.

20. An electrolyser system comprising the electrolyser module as claimed in claim 1 in combination with an electricity regeneration system.

21. An electrolyser system comprising the electrolyser module as claimed in claim 1 in combination with a gas conditioning system.

22. An electrolyser module comprising:
(a) a plurality of cell plates adapted to be arranged together in sealing engagement to define at least one electrolysis cell, at least one degassing chamber, at least one gas-liquid conduit, and at least one gas-liquid channel connecting said at least one electrolysis cell to said at least one gas-liquid conduit;
(b) at least one transfer channel for connecting said gas-liquid conduit to said at least one degassing chamber;
(c) at least one gas outlet conduit for connecting said at least one degassing chamber to a desired location for receiving gas and at least one degassed liquid conduit for connecting said at least one degassing chamber to a desired location for receiving degassed liquid; and
(d) a return plate, said return plate comprising a body, at least one degassing chamber opening defined in said body, at least one degassed liquid conduit opening defined in said body, a channel which connects the at least one degassing chamber opening to the at least one degassed liquid conduit opening, and at least a portion of the return plate is comprised of a conductive material.

23. The electrolyser module of claim 22, wherein the return plate is comprised substantially of a thermoplastic material.

24. The electrolyser module of claim 22, wherein the return plate comprises a bipolar plate.

25. The electrolyser module of claim 22, said return plate further comprising at least one gas outlet opening.

26. The electrolyser module of claim 22, wherein the return plate is substantially hollow.

27. The electrolyser module of claim 22, wherein the return plate further comprises liquid feed inlet openings.

28. The electrolyser module of claim 22, wherein the return plate further comprises openings for a mechanical circulation pump.

29. The electrolyser module of claim 22, wherein the return plate further comprises liquid cooling lines.

30. The electrolyser module of claim 22, wherein the return plate further comprises openings for detection or regulation equipment.

31. The electrolyser module of claim 22, wherein the return plate further comprises a pressure equalization conduit.

32. An electrolyser module comprising:
(a) a plurality of cell plates adapted to be arranged together in sealing engagement to define at least one electrolysis cell, at least one degassing chamber, at least one gas-liquid conduit, and at least one gas-liquid channel connecting said at least one electrolysis cell to said at least one gas-liquid conduit;
(b) at least one transfer channel for connecting said gas-liquid conduit to said at least one degassing chamber;
(c) at least one gas outlet conduit for connecting said at least one degassing chamber to a desired location for receiving gas and at least one degassed liquid conduit for connecting said at least one degassing chamber to a desired location for receiving degassed liquid; and
(d) a return plate, said return plate comprising a body, at least one degassing chamber opening defined in said body, at least one degassed liquid conduit opening defined in said body, a channel which connects the at least one degassing chamber opening to the at least one degassed liquid conduit opening, and a bipolar plate.

33. The electrolyser module of claim 32, wherein the return plate is comprised substantially of a thermoplastic material.

34. The electrolyser module of claim 32, said return plate further comprising at least one gas outlet opening.

35. The electrolyser module of claim 32, wherein the return plate is substantially hollow.

36. The electrolyser module of claim 32, wherein the return plate further comprises liquid feed inlet openings.

37. The electrolyser module of claim 32, wherein the return plate further comprises openings for a mechanical circulation pump.

38. The electrolyser module of claim 32, wherein the return plate further comprises liquid cooling lines.

39. The electrolyser module of claim 32, wherein the return plate further comprises openings for detection or regulation equipment.

40. The electrolyser module of claim 32, wherein the return plate further comprises a pressure equalization conduit.

41. An electrolyser module comprising:
(a) a plurality of cell plates adapted to be arranged together in sealing engagement to define at least one electrolysis cell, at least one degassing chamber, at least one gas-liquid conduit, and at least one gas-liquid channel connecting said at least one electrolysis cell to said at least one gas-liquid conduit;
(b) at least one transfer channel for connecting said gas-liquid conduit to said at least one degassing chamber;
(c) at least one gas outlet conduit for connecting said at least one degassing chamber to a desired location for receiving gas and at least one degassed liquid conduit for connecting said at least one degassing chamber to a desired location for receiving degassed liquid; and (d) a pressure equalization conduit.

42. The electrolyser module of claim 41, further comprising a return plate, the return plate comprising a body, first and second degassing chamber openings defined in the body, at least one degassed liquid conduit opening defined in the body, a channel which connects the degassing chamber openings to the at least one degassed liquid conduit opening, and the pressure equalization conduit which connects the first and second degassing chamber openings.

43. The electrolyser module of claim 42, wherein at least a portion of the return plate is comprised of a conductive material.

44. The electrolyser module of claim 42, wherein the return plate comprises a bipolar plate.

* * * * *